United States Patent
Yamashita et al.

(10) Patent No.: US 12,163,572 B2
(45) Date of Patent: Dec. 10, 2024

(54) SHOCK ABSORBER

(71) Applicant: HITACHI ASTEMO, LTD., Ibaraki (JP)

(72) Inventors: Mikio Yamashita, Hitachinaka (JP); Ryo Shinata, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 653 days.

(21) Appl. No.: 17/432,249

(22) PCT Filed: Jan. 15, 2020

(86) PCT No.: PCT/JP2020/001001
§ 371 (c)(1),
(2) Date: Aug. 19, 2021

(87) PCT Pub. No.: WO2020/174906
PCT Pub. Date: Sep. 3, 2020

(65) Prior Publication Data
US 2022/0186807 A1    Jun. 16, 2022

(30) Foreign Application Priority Data
Feb. 26, 2019  (JP) .................................. 2019-032704

(51) Int. Cl.
*F16F 9/516* (2006.01)
*F16F 9/18* (2006.01)
(Continued)

(52) U.S. Cl.
CPC .............. *F16F 9/516* (2013.01); *F16F 9/182* (2013.01); *F16F 9/185* (2013.01); *F16F 9/348* (2013.01);
(Continued)

(58) Field of Classification Search
CPC .................................. F16F 9/348; F16F 9/516
(Continued)

(56) References Cited

U.S. PATENT DOCUMENTS

| 4,495,790 A | 1/1985 | Muto et al. | |
|---|---|---|---|
| 5,248,014 A * | 9/1993 | Ashiba ...................... | F16F 9/50 188/282.8 |

(Continued)

FOREIGN PATENT DOCUMENTS

| DE | 112019006507 T5 | 9/2021 |
|---|---|---|
| JP | 58-30539 A | 2/1983 |

(Continued)

OTHER PUBLICATIONS

JP 2009287763 machine translation (Year: 2009).*
(Continued)

*Primary Examiner* — Melanie Torres Williams
(74) *Attorney, Agent, or Firm* — MATTINGLY & MALUR, PC

(57) ABSTRACT

A first damping force generation mechanism provided in a first passage formed in a piston to generate a damping force, and a second damping force generation mechanism provided in an annular valve seat member disposed in one of chambers and provided in a second passage in parallel with the first passage to generate a damping force, in which the second damping force generation mechanism includes a first sub-valve provided on one side of the second passage formed in the valve seat member and a second sub-valve (provided on the other side thereof, and a bottomed cylindrical cap member having an outer cylindrical part and a bottom part, and the cap member includes an inner cylindrical part into which the piston rod is able to be inserted
(Continued)

formed on an inner circumferential side of the bottom part and houses at least a part of the second damping force generation mechanism.

9 Claims, 8 Drawing Sheets

(51) Int. Cl.
*F16F 9/348* (2006.01)
*F16F 9/512* (2006.01)
*B60G 13/08* (2006.01)
*B60G 17/08* (2006.01)

(52) U.S. Cl.
CPC ............ *F16F 9/5126* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2800/162* (2013.01); *F16F 2222/12* (2013.01); *F16F 2228/066* (2013.01); *F16F 2232/08* (2013.01); *F16F 2234/02* (2013.01)

(58) Field of Classification Search
USPC ...................................... 188/282.5
See application file for complete search history.

(56) References Cited

U.S. PATENT DOCUMENTS

| 2015/0204408 A1* | 7/2015 | Morita ................ F16K 15/144 188/313 |
| 2018/0128341 A1 | 5/2018 | Mizuno |
| 2022/0074461 A1 | 3/2022 | Yamashita |

FOREIGN PATENT DOCUMENTS

| JP | 2009-257456 A | | 11/2009 |
| JP | 2009287763 A | * | 12/2009 |
| JP | 2013-204772 A | | 10/2013 |
| JP | 2018-76920 A | | 5/2018 |
| JP | 2018-105378 A | | 7/2018 |
| WO | 2018/062151 A | | 4/2018 |

OTHER PUBLICATIONS

International Search Report received in corresponding International Application No. PCT/JP2020/001001 dated Mar. 17, 2020.
Written Opinion received in corresponding International Application No. PCT/JP2020/001001 dated Mar. 17, 2020.
German Office Action received in corresponding German Application No. 11 2020 000 941.6 dated Jun. 30, 2023.

* cited by examiner

SHOCK ABSORBER

TECHNICAL FIELD

The present invention relates to a shock absorber. Priority is claimed on Japanese Patent Application No. 2019-032704 filed in Japan on Feb. 26, 2019, the content of which is incorporated herein by reference.

BACKGROUND ART

A shock absorber having two valves that open in the same stroke has been disclosed (see, for example, Patent Literatures 1 to 3).

CITATION LIST

Patent Literature

[Patent Literature 1]
Japanese Unexamined Patent Application, First Publication No. 2009-287763
[Patent Literature 2]
Japanese Unexamined Patent Application, First Publication No. 2013-204772
[Patent Literature 3]
Japanese Unexamined Patent Application, First Publication No. 2018-076920

SUMMARY OF INVENTION

Technical Problem

In shock absorbers, improvement in productivity is required.
Therefore, an objective of the present invention is to provide a shock absorber in which productivity can be improved.

Solution to Problem

An aspect of a shock absorber of the present invention includes a first passage and a second passage through which a working fluid flows out from a chamber on an upstream side to a chamber on a downstream side in a cylinder due to movement of a piston, a first damping force generation mechanism provided in the first passage formed in the piston to generate a damping force, and a second damping force generation mechanism provided in an annular valve seat member disposed in one of the chambers and provided in the second passage in parallel with the first passage to generate a damping force, in which the second damping force generation mechanism includes a first sub-valve provided on one side of the second passage formed in the valve seat member and a second sub-valve provided on the other side thereof, and a bottomed cylindrical cap member having an outer cylindrical part and a bottom part, and the cap member includes an inner cylindrical part into which the piston rod can be inserted formed on an inner circumferential side of the bottom part and houses at least a part of the second damping force generation mechanism.

Advantageous Effects of Invention

According to the shock absorber described above, productivity can be improved.

DESCRIPTION OF EMBODIMENTS

First Embodiment

Figure 1:
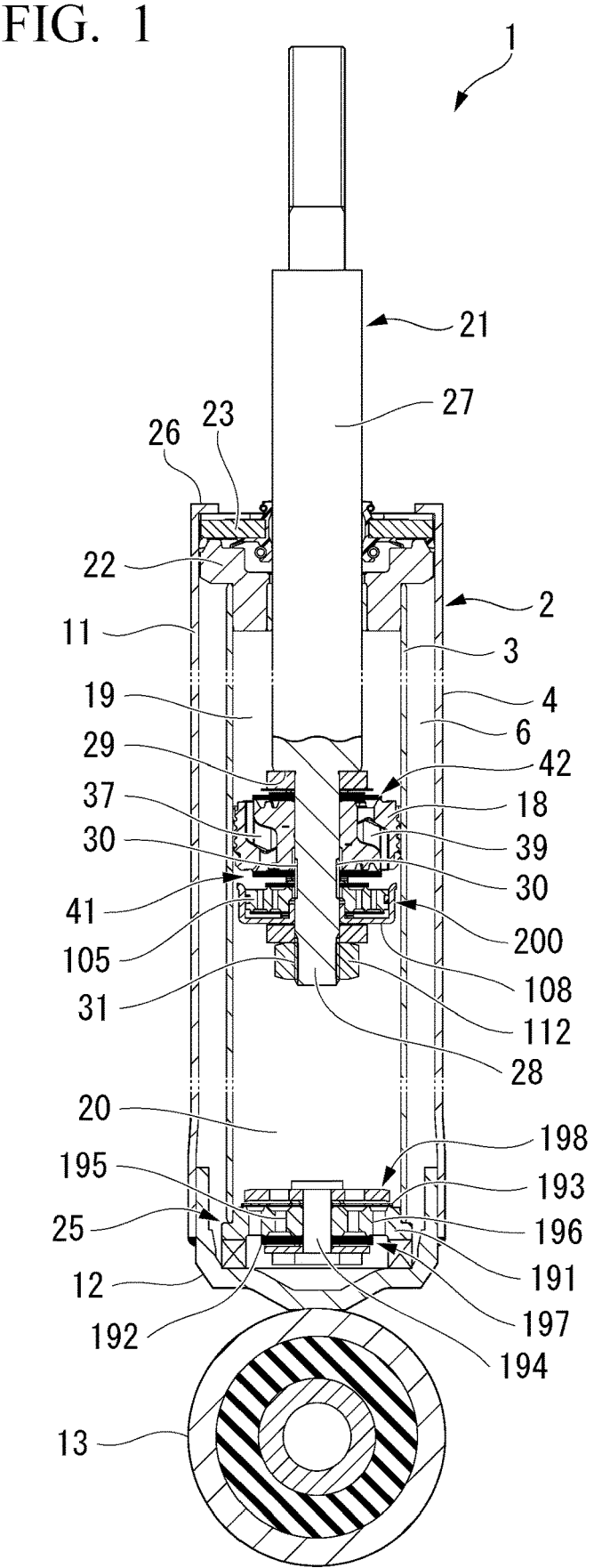
FIG. 1 is a cross-sectional view illustrating a shock absorber of a first embodiment according to the present invention.

A first embodiment according to the present invention will be described on the basis of FIGS. 1 to 4. Hereinafter, for convenience of description, an upper side in the drawing will be referred to as "upper" and a lower side in the drawing will be referred to as "lower."

As illustrated in FIG. 1, a shock absorber 1 of the first embodiment is a so-called multi type hydraulic shock absorber and includes a cylinder 2 in which an oil fluid (not illustrated) is sealed as a working fluid. The cylinder 2 includes a cylindrical inner tube 3, and a bottomed cylindrical outer tube 4 having a diameter larger than that of the inner tube 3 and concentrically provided to cover the inner tube 3. In the cylinder 2, a reservoir chamber 6 is formed between the inner tube 3 and the outer tube 4.

The outer tube 4 is constituted by a cylindrical barrel member 11 and a bottom member 12 fitted and fixed to a lower side of the barrel member 11 to close a lower portion of the barrel member 11. A mounting eye 13 is fixed to the bottom member 12 at a position on an outer side opposite to the barrel member 11.

The shock absorber 1 includes a piston 18 provided to be slidable inside the inner tube 3 of the cylinder 2. In the inner tube 3, the piston 18 defines two chambers including an upper chamber 19 which is one cylinder inner chamber and a lower chamber 20 (one chamber) which is the other cylinder inner chamber. In other words, the piston 18 is slidably provided in the cylinder 2 and partitions the inside of the cylinder 2 into the upper chamber 19 on one side and the lower chamber 20 on the other side. An oil fluid is sealed as a working fluid in the upper chamber 19 and the lower chamber 20 in the inner tube 3, and an oil fluid and a gas are sealed as working fluids in the reservoir chamber 6 between the inner tube 3 and outer tube 4.

The shock absorber 1 includes a piston rod 21 in which one end side portion in an axial direction is disposed inside the inner tube 3 of the cylinder 2 to be connected and fixed to the piston 18 and the other end side portion extends to the outside of the cylinder 2. The piston rod 21 penetrates the upper chamber 19 and does not penetrate the lower chamber 20. Therefore, the upper chamber 19 is a rod side chamber into which the piston rod 21 penetrates, and the lower chamber 20 is a bottom side chamber on a bottom side of the cylinder 2.

The piston 18 and the piston rod 21 move together. The piston 18 moves to the upper chamber 19 side in an extension stroke of the shock absorber 1 in which a protrusion amount of the piston rod 21 from the cylinder 2 increases. The piston 18 moves to the lower chamber 20 side in a compression stroke of the shock absorber 1 in which the protrusion amount of the piston rod 21 from the cylinder 2 decreases.

A rod guide 22 is fitted to an upper end opening side of the inner tube 3 and the outer tube 4. A seal member 23 is fitted on an upper side of the outer tube 4 which is an outer side of the cylinder 2 with respect to the rod guide 22. The rod guide 22 and the seal member 23 are both annular. The piston rod 21 is slidably inserted into insides of the rod guide 22 and the seal member 23 and extends from the inside of the cylinder 2 to the outside. One end side portion of the piston rod 21 in the axial direction is fixed to the piston 18 in inside the cylinder 2, and the other end side portion of the piston rod 21 protrudes to the outside of the cylinder 2 via the rod guide 22 and the seal member 23.

The rod guide 22 guides movement of the piston rod 21 by supporting the piston rod 21 to be movable in the axial direction while restricting its movement in a radial direction. The seal member 23 is in close contact with the outer tube 4 at its outer circumferential portion and is in sliding contact with an outer circumferential portion of the piston rod 21 moving in the axial direction at its inner circumferential portion. Thereby, the seal member 23 prevents the oil fluid in the inner tube 3 and the high-pressure gas and the oil fluid of the reservoir chamber 6 in the outer tube 4 from leaking to the outside.

The rod guide 22 has an outer circumferential portion formed in a stepped shape in which an upper portion has a larger diameter than a lower portion. The rod guide 22 is fitted to an inner circumferential portion of an upper end of the inner tube 3 at the lower portion of the small diameter and is fitted to an inner circumferential portion of an upper portion of the outer tube 4 at the upper portion of the large diameter. A base valve 25 which defines the lower chamber 20 and the reservoir chamber 6 is installed on the bottom member 12 of the outer tube 4. An inner circumferential portion of a lower end of the inner tube 3 is fitted to the base valve 25. An upper end portion of the outer tube 4 is swaged radially inward to form a locking part 26. The locking part 26 and the rod guide 22 sandwich the seal member 23.

The piston rod 21 includes a main shaft part 27 and a mounting shaft part 28 which has a smaller diameter than the main shaft part 27. In the piston rod 21, the main shaft part 27 is slidably fitted to the rod guide 22 and the seal member 23, and the mounting shaft part 28 is disposed in the cylinder 2 and connected to the piston 18 and the like. An end portion of the main shaft part 27 on the mounting shaft part 28 side is a shaft step part 29 which extends in a direction perpendicular to the axial direction. On an outer circumferential portion of the mounting shaft part 28, a pair of passage notch portions 30 extending in the axial direction are formed at an intermediate position in the axial direction, and a male screw 31 is formed at a distal end position on a side opposite to the main shaft part 27 in the axial direction. The passage notch portions 30 have a so-called width across flat shape formed by cutting out two positions of the mounting shaft part 28 that differ by 180 degrees in a circumferential direction in parallel in a planar shape.

In the shock absorber 1, for example, the protruding portion of the piston rod 21 from the cylinder 2 is disposed on an upper portion to be supported by a vehicle body, and the mounting eye 13 on the cylinder 2 side is disposed on a bottom portion to be connected to a wheel side. Conversely, the cylinder 2 side may be supported by a vehicle body, and the piston rod 21 may be connected to a wheel side.

Figure 2:
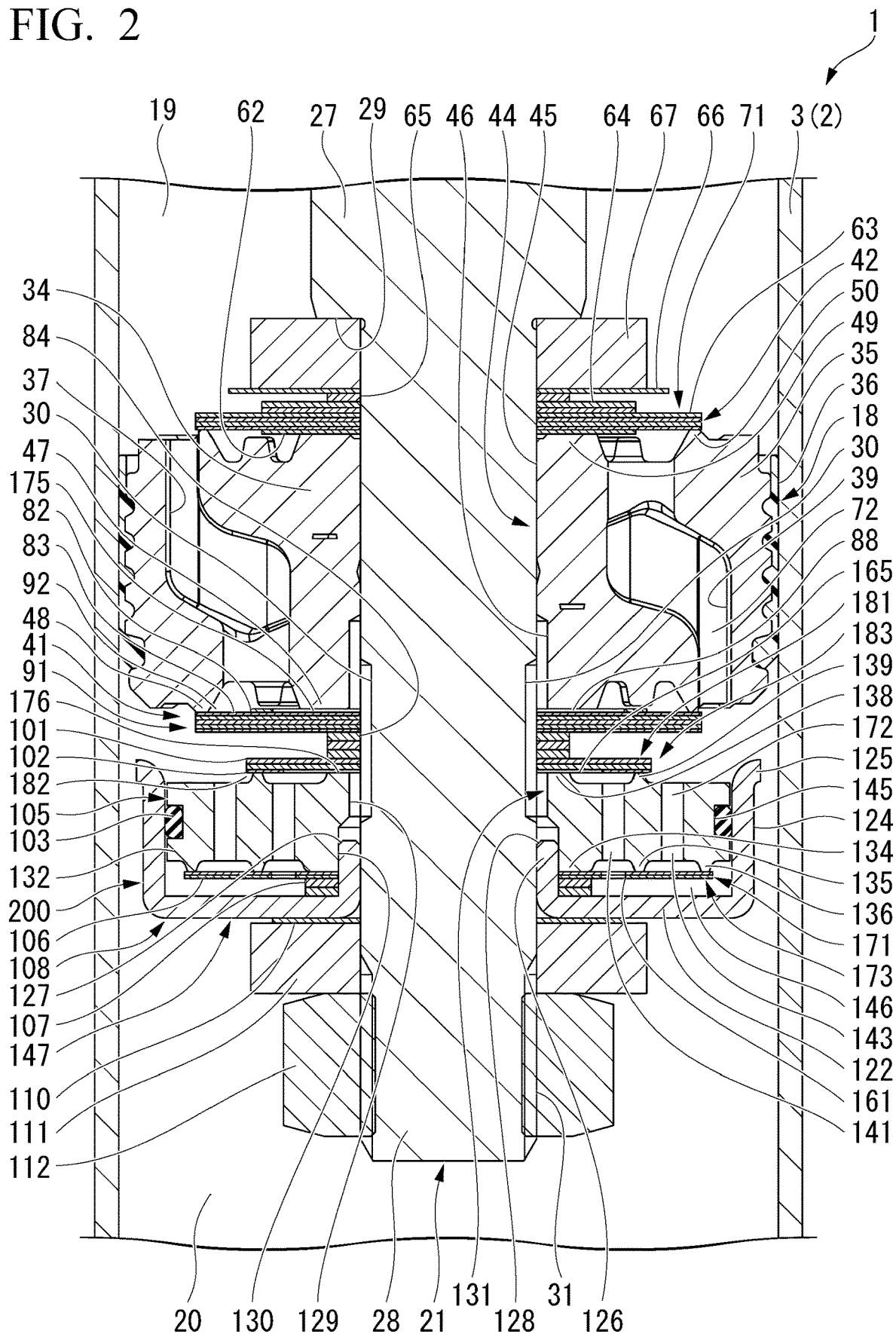
FIG. 2 is a partial cross-sectional view illustrating surroundings of a piston of the shock absorber of the first embodiment according to the present invention.

As illustrated in FIG. 2, the piston 18 is constituted by a piston main body 35 made of a metal and connected to the piston rod 21, and an annular slide member 36 made of a synthetic resin and integrally mounted on an outer circumferential surface of the piston main body 35 to slide in the inner tube 3.

The piston main body 35 includes an annular main body part 34. The main body part 34 includes a plurality (only one is illustrated in FIG. 2 because it is a cross section) passage holes 37 that allow communication between the upper chamber 19 and the lower chamber 20, and a plurality (only one is illustrated in FIG. 2 because it is a cross section) of passage holes 39 that allow communication between the upper chamber 19 and the lower chamber 20. The piston main body 35 is a sintered product. The passage holes 37 and 39 are formed at the time of sintering. Alternatively, the passage holes 37 and 39 are formed by cutting with a drill.

Each of the plurality of passage holes 37 is formed at equal pitches with one of the passage hole 39 interposed therebetween in a circumferential direction of the piston main body 35 and constitutes one half of the passage holes 37 and 39 in number. The plurality of passage holes 37 have a crank shape having two bending points. The plurality of passage holes 37 on one side (upper side in FIG. 2) of the piston 18 in the axial direction open outward in the radial direction of the piston 18, and those on the other side (lower side in FIG. 2) of the piston 18 in the axial direction open further inward in the radial direction of the piston 18 than those on the one side.

A first damping force generation mechanism 41 that opens and closes passages in the passage holes 37 to generate a damping force is provided on the lower chamber 20 side of these passage holes 37. When the first damping force generation mechanism 41 is disposed on the lower chamber 20 side, the passages in the plurality of passage holes 37 serve as extension-side passages through which the oil fluid flows out toward the lower chamber 20 on a downstream side from the upper chamber 19 on an upstream side when the piston 18 moves to the upper chamber 19 side, that is, in an extension stroke. The first damping force generation mechanism 41 provided with respect to the passages in these passage holes 37 serves as an extension-side damping force generation mechanism that generates a damping force by suppressing a flow of the oil fluid from the passages in the extension-side passage holes 37 to the lower chamber 20.

The passage holes 39 constituting the remaining half of the passage holes 37 and 39 are formed at equal pitches with each one of the passage holes 37 interposed therebetween in the circumferential direction of the piston main body 35.

The plurality of passage holes 39 have a crank shape having two bending points, those on the other side (lower side in FIG. 2) of the piston 18 in the axial direction open outward in the radial direction of the piston 18, and those on the one side (upper side in FIG. 2) of the piston 18 in the axial direction open further inward in the radial direction of the piston 18 than those on the other side.

A first damping force generation mechanism 42 that opens and closes passages in the passage holes 39 to generate a damping force is provided on the upper chamber 19 side of these passage holes 39. When the first damping force generation mechanism 42 is disposed on the upper chamber 19 side, the passages in the plurality of passage holes 39 serve as compression-side passages through which the oil fluid flows out toward the upper chamber 19 on a downstream side from the lower chamber 20 on an upstream side when the piston 18 moves to the lower chamber 20 side, that is, in a compression stroke. The first damping force generation mechanism 42 provided with respect to the passages in these passage holes 39 serves as a damping force generation mechanism on the compression side that generates a damping force by suppressing a flow of the oil fluid from the passages in the compression-side passage holes 39 to the upper chamber 19.

The piston main body 35 has substantially a disc shape. An insertion hole 44 into which the mounting shaft part 28 of the piston rod 21 is inserted is formed to penetrate in the axial direction at a center of the piston main body 35 in the radial direction. The insertion hole 44 includes a small diameter hole portion 45 on one side in the axial direction into which the mounting shaft part 28 of the piston rod 21 is fitted, and a large diameter hole portion 46 on the other side in the axial direction having a larger diameter than the small diameter hole portion 45. When the piston 18 is fitted to the mounting shaft part 28 in the small diameter hole portion 45, the piston 18 is positioned in the radial direction with respect to the mounting shaft part 28.

At an end portion of the piston main body 35 on the lower chamber 20 side in the axial direction, an annular inner seat part 47 protruding in the axial direction further than the main body part 34 is formed on a radial inner side of the piston main body 35 with respect to the openings of the passage holes 37 on the lower chamber 20 side. At an end portion of the piston main body 35 on the lower chamber 20 side in the axial direction, an annular valve seat part 48 constituting a part of the first damping force generation mechanism 41 is formed to protrude in the axial direction further than the main body part 34 on a radial outer side of the piston main body 35 with respect to the openings of the passage holes 37 on the lower chamber 20 side.

At an end portion of the piston main body 35 on the upper chamber 19 side in the axial direction, an annular inner seat part 49 protruding in the axial direction further than the main body part 34 is formed on a radial inner side of the piston main body 35 with respect to the openings of the passage holes 39 on the upper chamber 19 side. At an end portion of the piston main body 35 on the upper chamber 19 side in the axial direction, an annular valve seat part 50 constituting a part of the first damping force generation mechanism 42 is formed to protrude in the axial direction further than the main body part 34 on a radial outer side of the piston main body 35 with respect to the openings of the passage holes 39 on the upper chamber 19 side.

In the insertion hole 44 of the piston main body 35, the large diameter hole portion 46 is provided on the inner seat part 47 side in the axial direction with respect to the small diameter hole portion 45. A passage of the piston main body 35 in the large diameter hole portion 46 is in constant communication with a passage of the piston rod 21 in the passage notch portions 30.

In the piston main body 35, the main body part 34 on a radial outer side of the valve seat part 48 has a stepped shape of which a height in the axial direction is lower than that of the valve seat part 48. The openings of the compression-side passage holes 39 on the lower chamber 20 side are disposed in the stepped shape portion of the piston main body 35. Similarly, in the piston main body 35, the main body part 34 on a radial outer side of the valve seat part 50 has a stepped shape of which a height in the axial direction is lower than that of the valve seat part 50. The openings of the extension-side passage holes 37 on the upper chamber 19 side are disposed in the stepped shape portion.

The compression-side first damping force generation mechanism 42 includes the valve seat part 50 of the piston 18 and includes one disc 62, a plurality of (specifically, four) discs 63 having the same inner diameter and the same outer diameter, and a plurality of (specifically, two) discs 64 having the same inner diameter and the same outer diameter in order from the side of the piston 18 in the axial direction. On a side of the discs 64 opposite to the discs 63, one disc 65, one disc 66, and one annular member 67 are provided in order from the side of the discs 64. The discs 62 to 66 and the annular member 67 are made of a metal and have a bored circular flat plate shape having a certain thickness into which the mounting shaft part 28 of the piston rod 21 can be fitted on an inner side. When the discs 62 to 66 and the annular member 67 are fitted to the mounting shaft part 28, they are positioned in the radial direction with respect to the mounting shaft part 28.

The disc 62 has an outer diameter larger than an outer diameter of the inner seat part 49 of the piston 18 and smaller than an inner diameter of the valve seat part 50 and is in constant contact with the inner seat part 49. The plurality of discs 63 have an outer diameter substantially the same as an outer diameter of the valve seat part 50 of the piston 18 and can be seated on the valve seat part 50.

The plurality of discs 64 have an outer diameter smaller than an outer diameter of the discs 63. The disc 65 has an outer diameter smaller than the outer diameter of the discs 64 and smaller than an outer diameter of the inner seat part 49 of the piston 18. The disc 66 has an outer diameter larger than the outer diameter of the discs 64 and smaller than the outer diameter of the discs 63. The annular member 67 has an outer diameter smaller than the outer diameter of the disc 66 and larger than an outer diameter of the shaft step part 29 of the piston rod 21. The annular member 67 has a larger thickness and a higher rigidity than the discs 62 to 66 and is in contact with the shaft step part 29.

The plurality of discs 63 and the plurality of discs 64 constitute a compression-side main valve 71 that can be separated from and seated on the valve seat part 50. When the main valve 71 is separated from the valve seat part 50, the passages in the passage holes 39 are caused to communicate with the upper chamber 19, and a flow of the oil fluid between the main valve 71 and the valve seat part 50 is suppressed to generate a damping force. The annular member 67, together with the disc 66, restricts deformation of the main valve 71 equal to or higher than a specified value in an opening direction.

A passage between the main valve 71 and the valve seat part 50 that appears when the valve opens and the passages in the passage holes 39 constitute a compression-side first passage 72 in which the oil fluid flows out from the lower chamber 20 on the upstream side to the upper chamber 19 on the downstream side in the cylinder 2 due to movement of the piston 18 to the lower chamber 20 side. The compression-side first damping force generation mechanism 42 that generates a damping force includes the main valve 71 and the valve seat part 50. Therefore, the compression-side first damping force generation mechanism 42 is provided in the first passage 72. The first passage 72 is formed in the piston 18 including the valve seat part 50, and the oil fluid passes therethrough when the piston rod 21 and the piston 18 move to the compression side.

Here, in the compression-side first damping force generation mechanism 42, a fixed orifice that allows communication between the upper chamber 19 and the lower chamber 20 is not formed in either of the valve seat part 50 and the main valve 71 in contact with the valve seat part 50 even when they are in contact with each other. That is, the compression-side first damping force generation mechanism 42 does not allow communication between the upper chamber 19 and the lower chamber 20 when the valve seat part 50 and the main valve 71 are in contact with each other over the entire circumference. In other words, the first passage 72 does not include a fixed orifice formed to allow constant communication between the upper chamber 19 and the lower chamber 20 and is not a passage that allows constant communication between the upper chamber 19 and the lower chamber 20. The first damping force generation mechanism 42 is in a valve closed state when the piston rod 21 and the piston 18 move to the extension side and does not allow the oil fluid to pass through the first passage 72.

The extension-side first damping force generation mechanism 41 includes the valve seat part 48 of the piston 18 and includes one disc 82 and a plurality of discs 83 (specifically, five) having the same inner diameter and the same outer diameter in order from the side of the piston 18 in the axial direction. A plurality of (specifically, three) discs 84 having the same inner diameter and the same outer diameter are provided on a side of the discs 83 opposite to the disc 82. The discs 82 to 84 are made of a metal, have a bored circular flat plate shape having a certain thickness into which the mounting shaft part 28 of the piston rod 21 can be fitted on an inner side, and are fitted to the mounting shaft part 28 to be positioned in the radial direction with respect to the mounting shaft part 28.

Figure 3:
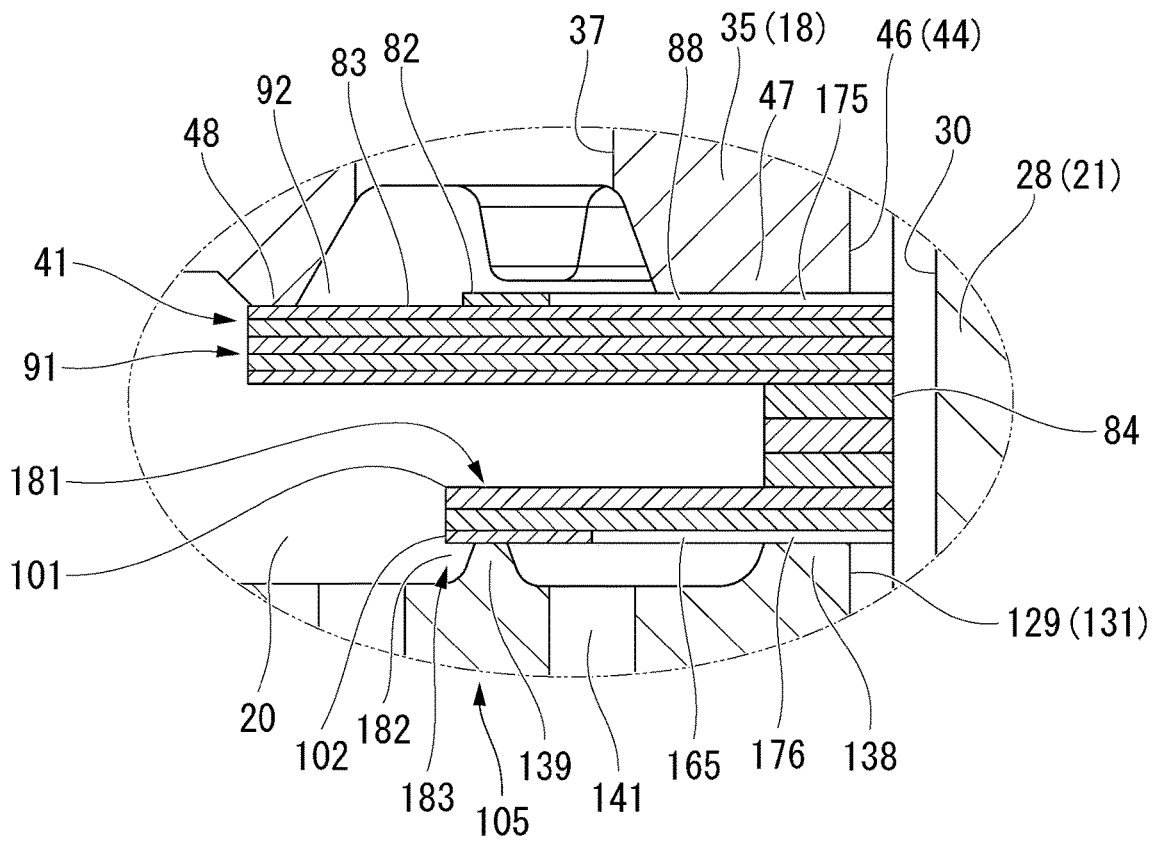
FIG. 3 is a partial cross-sectional view illustrating surroundings of an orifice of the shock absorber of the first embodiment according to the present invention.

The disc 82 has an outer diameter larger than an outer diameter of the inner seat part 47 of the piston 18 and smaller than an inner diameter of the valve seat part 48 and is in constant contact with the inner seat part 47. As illustrated in FIG. 3, a notch portion 88 that allows the passages in the passage holes 37 to constantly communicate with the passage in the large diameter hole portion 46 of the piston 18 and the passages in the passage notch portions 30 of the piston rod 21 is formed in the disc 82 from a position on an outer side of the inner seat part 47 in the radial direction to an inner circumferential edge portion.

The plurality of discs 83 have an outer diameter substantially the same as an outer diameter of the valve seat part 48 of the piston 18 and can be seated on the valve seat part 48. The discs 84 have an outer diameter smaller than the outer diameter of the discs 83 and smaller than the outer diameter of the inner seat part 47 of the piston 18.

The plurality of discs 83 constitute an extension-side main valve 91 that can be separated from and seated on the valve seat part 48. When the main valve 91 is separated from the valve seat part 48, the passages in the passage holes 37 are caused to communicate with the lower chamber 20, a flow of the oil fluid between the main valve 91 and the valve seat part 48 is suppressed, and thereby a damping force is generated.

As illustrated in FIG. 2, a passage between the main valve 91 and the valve seat part 48 that appears when the valve opens and the passages in the passage holes 37 constitute an extension-side first passage 92 in which the oil fluid flows out from the upper chamber 19 on an upstream side to the lower chamber 20 on a downstream side in the cylinder 2 due to movement of the piston 18 to the upper chamber 19 side. The extension-side first damping force generation mechanism 41 that generates a damping force includes the main valve 91 and the valve seat part 48 and is therefore provided in the first passage 92. The first passage 92 is formed in the piston 18 including the valve seat part 48, and the oil fluid passes therethrough when the piston rod 21 and the piston 18 move to the extension side.

In the extension-side first damping force generation mechanism 41, a fixed orifice that allows communication between the upper chamber 19 and the lower chamber 20 is not formed in either of the valve seat part 48 and the main valve 91 in contact with the valve seat part 48 even when they are in contact with each other. That is, the extension-side first damping force generation mechanism 41 does not allow communication between the upper chamber 19 and the lower chamber 20 when the valve seat part 48 and the main valve 91 are in contact with each other over the entire circumference. In other words, the first passage 92 does not include a fixed orifice formed to allow constant communication between the upper chamber 19 and the lower chamber 20 and is not a passage that allows constant communication between the upper chamber 19 and the lower chamber 20. The first damping force generation mechanism 41 is in a valve closed state when the piston rod 21 and the piston 18 move to the compression side and does not allow the oil fluid to pass through the first passage 92.

On a side of the plurality of discs 84 opposite to the piston 18, a plurality of (specifically, two) discs 101 having the same inner diameter and the same outer diameter, one disc 102 having the same outer diameter as the discs 101, one valve seat member 105 including one seal member 103 provided on an outer circumferential side, a plurality of (specifically, two) discs 106 having the same inner diameter and the same outer diameter, a plurality of (specifically, two) discs 107 having the same inner diameter and the same outer diameter, one cap member 108, one disc 110, and one annular member 111 are provided in order from the side of the piston 18 with the mounting shaft part 28 of the piston rod 21 inserted on an inner side of each of them. The male screw 31 is formed on the mounting shaft part 28 of the piston rod 21 at a portion protruding toward a side opposite to the piston 18 further than the annular member 111. A nut 112 is screwed onto the male screw 31. The nut 112 is in contact with the annular member 111.

The discs 101, 102, 106, 107, 110, the valve seat member 105, the cap member 108, and the annular member 111 are all made of a metal. The seal member 103 is made of an elastic material such as rubber. The discs 101, 102, 106, 107, 110 and the annular member 111 all have a bored circular flat plate shape having a certain thickness into which the mounting shaft part 28 of the piston rod 21 can be fitted on an inner side and are fitted to the mounting shaft part 28 to be positioned in the radial direction with respect to the mounting shaft part 28. The cap member 108 and the valve seat member 105 are both formed in an annular shape through which the mounting shaft part 28 of the piston rod 21 can be inserted on an inner side thereof. The cap member 108 is fitted to the mounting shaft part 28 of the piston rod 21, and thereby the cap member 108 is positioned in the radial direction with respect to the mounting shaft part 28.

The cap member 108 is an integrally formed product having a bottomed cylindrical shape and is formed by punching and plastically deforming a metal plate having a certain thickness by press forming. The cap member 108 includes a bottom part 122 having a bored circular flat plate shape, a cylindrical outer cylindrical part 124 extending toward one side in the axial direction of the bottom part 122 from an outer circumferential edge portion of the bottom part 122, an opening enlarged diameter part 125 extending from an end edge portion of the outer cylindrical part 124 on a side opposite to the bottom part 122 in the axial direction while a diameter thereof expands in a direction opposite to the bottom part 122, and a cylindrical inner cylindrical part 126 extending toward the same side as the outer cylindrical part 124 in the axial direction of the bottom part 122 from an inner circumferential edge portion of the bottom part 122.

In the cap member 108, the bottom part 122, the outer cylindrical part 124, the opening enlarged diameter part 125, and the inner cylindrical part 126 are coaxially disposed. A cross section of the opening enlarged diameter part 125 in a plane including a central axis of the cap member 108 has an arc shape. The inner cylindrical part 126 has a smaller axial length than the outer cylindrical part 124, and the entire opening enlarged diameter part 125 is positioned on a side opposite to the bottom part 122 in the axial direction with respect to the inner cylindrical part 126. In the inner cylindrical part 126, a chamfer 127 is formed over the entire circumference on an outer circumferential edge portion of an end portion on a side opposite to the bottom part 122 in the axial direction, and a chamfer 128 is also formed over the entire circumference on an inner circumferential edge portion of the same end portion.

In the cap member 108, the piston rod 21 can be inserted into an inner side of the inner cylindrical part 126 on an inner circumferential side of the bottom part 122. The cap member 108 is fitted to the mounting shaft part 28 of the piston rod 21 at an inner circumferential portion of the inner cylindrical part 126 with the bottom part 122 disposed to face a side opposite to the piston 18. Thereby, the cap member 108, including the inner cylindrical part 126, is positioned in the radial direction with respect to the mounting shaft part 28.

The valve seat member 105 has substantially a disc shape having an outer diameter smaller than an inner diameter of the outer cylindrical part 124 of the cap member 108. The valve seat member 105 includes a main body part 132 having a bored circular flat plate shape in which a through hole 131 through which the mounting shaft part 28 is inserted is formed to penetrate in a thickness direction at a center in the radial direction. The through hole 131 includes a small diameter hole portion 129 on one side in the axial direction, and a large diameter hole portion 130 on the other side in the axial direction having a larger diameter than the small diameter hole portion 129. The valve seat member 105 includes an inner seat part 134, an intermediate valve seat part 135, and an outer valve seat part 136 in order from an inner side in the radial direction of the main body part 132 on the large diameter hole portion 130 side of the main body part 132 in the axial direction. The valve seat member 105 includes an inner seat part 138 and a valve seat part 139 in order from an inner side in the radial direction of the main body part 132 on the small diameter hole portion 129 side in the axial direction.

The inner seat part 134 has an annular shape and protrudes toward one side in the axial direction of the main body part 132 from an inner circumferential edge portion of the main body part 132. The intermediate valve seat part 135 also has an annular shape and protrudes toward the same side as the inner seat part 134 in the axial direction of the main body part 132 from an intermediate position in the radial direction of the main body part 132 which is an outer side of the inner seat part 134. The outer valve seat part 136 also has an annular shape and protrudes toward the same side as the inner seat part 134 in the axial direction of the main body part 132 from an outer circumferential side in the radial direction of the main body part 132 which is an outer side of the intermediate valve seat part 135.

The inner seat part 138 also has an annular shape and protrudes from the inner circumferential edge portion of the main body part 132 toward a side opposite to the inner seat part 134 in the axial direction of the main body part 132. Both radial inner sides of the inner seat parts 134 and 138 are the through hole 131. The valve seat part 139 also has an annular shape and protrudes toward the same side as the inner seat part 138 in the axial direction of the main body part 132 from an intermediate position in the radial direction of the main body part 132 which is an outer side of the inner seat part 138. The intermediate valve seat part 135 and the valve seat part 139 have the same inner diameter and the same outer diameter.

In the main body part 132, an inner passage hole 141 that axially penetrates the main body part 132 is formed between the inner seat parts 134 and 138, and the intermediate valve seat part 135 and the valve seat part 139. A plurality of inner passage holes 141 are formed at regular intervals in a circumferential direction of the main body part 132. In the main body part 132, an outer passage hole 143 that axially penetrates the main body part 132 is formed on a radial outer side of the valve seat part 139 between the intermediate valve seat part 135 and the outer valve seat part 136. A plurality of outer passage holes 143 are disposed on an outer side of the inner passage holes 141 in the radial direction of the main body part 132 and formed at regular intervals in the circumferential direction of the main body part 132.

An annular seal groove 145 that is recessed inward in the radial direction is formed at an axially intermediate position on an outer circumferential portion of the main body part 132. The seal member 103 is disposed in the seal groove 145.

The seal member 103 is an O-ring and is fitted to a groove bottom surface, which is a cylindrical surface of the seal groove 145, with a fastening allowance over the entire circumference.

In a state in which the inner seat part 134, the intermediate valve seat part 135, and the outer valve seat part 136 are directed toward the bottom part 122, an outer circumferential side of the valve seat member 105, in the main body part 132, is inserted into the outer cylindrical part 124 of the cap member 108, and therefore the valve seat member 105 is housed in the cap member 108. In this state, the seal member 103 is fitted to an inner circumferential surface of the outer cylindrical part 124 of the cap member 108 with a fastening allowance over the entire circumference and is elastically deformed to seal a clearance between the outer cylindrical part 124 and the main body part 132 of the valve seat member 105. At the same time, an inner circumferential side of the valve seat member 105 is fitted to the inner cylindrical part 126 of the cap member 108 in the large diameter hole portion 130 of the through hole 131. Thereby, the valve seat member 105 is positioned in the radial direction with respect to the inner cylindrical part 126 of the cap member 108.

The cap member 108, the valve seat member 105, and the seal member 103 constitute a housing 147 that forms a cap chamber 146 therein. The cap chamber 146 is provided between the bottom part 122 of the cap member 108 and the valve seat member 105 in the housing 147. The plurality of discs 107 and the plurality of discs 106 are provided in the cap chamber 146. In the valve seat member 105, the intermediate valve seat part 135 and the outer valve seat part 136 are disposed on the cap chamber 146 side, and the valve seat part 139 is disposed on the lower chamber 20 side. The housing 147 including the annular valve seat member 105 is disposed in the lower chamber 20. The valve seat member 105 partitions the cap chamber 146 and the lower chamber 20 and is provided to face both the cap chamber 146 and the lower chamber 20.

The plurality of discs 106 have an outer diameter substantially the same as an outer diameter of the outer valve seat part 136 of the valve seat member 105 and have an inner diameter the same as an outer diameter of the inner cylindrical part 126 of the cap member 108. The plurality of discs 106 are fitted to an outer circumferential portion of the inner cylindrical part 126 of the cap member 108 at an inner circumferential portion thereof. Thereby, the plurality of discs 106 are positioned in the radial direction with respect to the inner cylindrical part 126 of the cap member 108. The plurality of discs 106 are in constant contact with the inner seat part 134 and can be seated on the outer valve seat part 136 and the intermediate valve seat part 135. The plurality of discs 106 have through holes 161 penetrating in the axial direction each formed at an intermediate position in the radial direction between the inner seat part 134 and the intermediate valve seat part 135. Passages in the through holes 161 allow passages in the inner passage holes 141 of the valve seat member 105 to constantly communicate with the cap chamber 146.

The plurality of discs 107 have an outer diameter smaller than the outer diameter of the discs 106 and substantially the same as an outer diameter of the inner seat part 134 of the valve seat member 105 and have an inner diameter the same as the outer diameter of the inner cylindrical part 126 of the cap member 108. The plurality of discs 107 are fitted to the outer circumferential portion of the inner cylindrical part 126 of the cap member 108 at an inner circumferential portion thereof. Thereby, the plurality of discs 107 are positioned in the radial direction with respect to the inner cylindrical part 126 of the cap member 108.

The disc 102 has an outer diameter substantially the same as an outer diameter of the valve seat part 139 of the valve seat member 105. The disc 102 is in constant contact with the inner seat part 138 and can be seated on the valve seat part 139. The plurality of discs 101 have an outer diameter substantially the same as the outer diameter of the disc 102 and are stacked on a side of the disc 102 opposite to the valve seat member 105.

As illustrated in FIG. 3, in the disc 102, a notch portion 165 that allows the passages in the inner passage holes 141 to constantly communicate with the passage in the small diameter hole portion 129 of the valve seat member 105 and the passages in the passage notch portions 30 of the piston rod 21 is formed from an intermediate position on an inner side of the valve seat part 139 and on an outer side of the inner seat part 138 in the radial direction to the inner circumferential edge portion.

As illustrated in FIG. 2, the cap chamber 146 is in constant communication with the upper chamber 19 via the passages in the through holes 161 of the discs 106, the passages in the inner passage holes 141 of the valve seat member 105, the passage in the notch portion 165 of the disc 102, the passage in the small diameter hole portion 129 of the valve seat member 105, the passages in the passage notch portions 30 of the piston rod 21, the passage in the large diameter hole portion 46 of the piston 18, the passage in the notch portion 88 of the disc 82, and the passages in the passage holes 37 of the piston 18.

The plurality of discs 106 constitute a sub-valve 171 (second sub-valve) that can be separated from and seated on the outer valve seat part 136 and the intermediate valve seat part 135.

The sub-valve 171 is provided in the cap chamber 146 and allows passages in the outer passage holes 143 and the cap chamber 146 to communicate with each other when the sub-valve 171 is separated from the outer valve seat part 136 in the cap chamber 146. Therefore, the sub-valve 171 allows the lower chamber 20 to communicate with the upper chamber 19 via the passages in the outer passage holes 143, the cap chamber 146, the passages in the through holes 161 of the plurality of discs 106, the passages in the inner passage holes 141, the passage in the notch portion 165 of the disc 102, the passage in the small diameter hole portion 129 of the valve seat member 105, the passages in the passage notch portions 30 of the piston rod 21, the passage in the large diameter hole portion 46 of the piston 18, the passage in the notch portion 88 of the disc 82, and the passages in the passage holes 37 of the piston 18. At this time, the sub-valve 171 suppresses a flow of the oil fluid between the sub-valve 171 and the outer valve seat part 136 to generate a damping force. The sub-valve 171 is an inflow valve that opens when the oil fluid is caused to flow into the cap chamber 146 from the lower chamber 20 via the passages in the outer passage holes 143 and is a check valve that restricts an outflow of the oil fluid from the cap chamber 146 to the lower chamber 20 via the passages in the outer passage holes 143.

The passages in the outer passage holes 143, the passage between the sub-valve 171 and the outer valve seat part 136 that appears when the valve opens, the cap chamber 146, the passages in the through holes 161 of the discs 106, the passages in the inner passage holes 141 of the valve seat member 105, the passage in the notch portion 165 of the disc 102 the passage in the small diameter hole portion 129 of the valve seat member 105, the passages in the passage notch portions 30 of the piston rod 21, the passage in the large diameter hole portion 46 of the piston 18, the passage in the notch portion 88 of the disc 82, and the passages in the passage holes 37 constitute a second passage 172 in which the oil fluid flows out from the lower chamber 20 on the upstream side to the upper chamber 19 on the downstream side in the cylinder 2 due to movement of the piston 18 to the lower chamber 20 side.

The second passage 172 is a compression-side passage through which the oil fluid flows out from the lower chamber 20 on the upstream side to the upper chamber 19 on the downstream side when the piston 18 moves to the lower chamber 20 side, that is, in the compression stroke. The second passage 172 includes the passages in the passage notch portions 30 formed by cutting out the piston rod 21, in other words, a part thereof is formed by cutting out the piston rod 21.

The sub-valve 171, the outer valve seat part 136, the intermediate valve seat part 135, and the cap member 108 are provided in the compression-side second passage 172 to constitute a compression-side second damping force generation mechanism 173 that opens and closes the second passage 172 and suppresses a flow of the oil fluid from the second passage 172 to the upper chamber 19 to generate a damping force. In other words, the outer valve seat part 136 and the intermediate valve seat part 135 of the second damping force generation mechanism 173 are provided on the valve seat member 105. The sub-valve 171 constituting the compression-side second damping force generation mechanism 173 is a sub-valve on the compression side.

The cap member 108 has a substantially constant thickness and is thicker than the discs 106 constituting the sub-valve 171. In addition to this, the outer cylindrical part 124 and the inner cylindrical part 126 are formed on both sides in the radial direction, and thereby the bottom part 122 has higher rigidity than the discs 106. Therefore, the bottom part 122 of the cap member 108 is in contact with the sub-valve 171 to restrict deformation equal to or higher than a specified value in the opening direction.

In the second passage 172, the passage in the notch portion 165 of the disc 102 is an orifice 176 that is narrowed in a portion in which a flow path cross-sectional area is fixed, and the passage in the notch portion 88 of the disc 82 is also an orifice 175 that is narrowed in a portion in which a flow path cross-sectional area is fixed. The orifices 175 and 176 are disposed downstream of the sub-valve 171 in a flow of the oil fluid when the sub-valve 171 opens and the oil fluid flows in the compression-side second passage 172. In the second passage 172, the orifice 176 is disposed on an upstream side in the flow of the oil fluid when the sub-valve 171 opens, and the orifice 175 is disposed on a downstream side. Further, the second passage 172 may have a configuration in which only one of the orifices 175 and 176 is provided.

In the compression-side second damping force generation mechanism 173, a fixed orifice that allows communication between the lower chamber 20 and the upper chamber 19 is not formed in any of the outer valve seat part 136, the intermediate valve seat part 135, and the sub-valve 171 in contact with these even when they are in contact with each other. That is, the compression-side second damping force generation mechanism 173 does not allow the lower chamber 20 and the upper chamber 19 to communicate with each other in a state in which the outer valve seat part 136 and the intermediate valve seat part 135 are in contact with the discs 106 over the entire circumference. In other words, the second passage 172 does not include a fixed orifice formed to allow constant communication between the lower chamber 20 and the upper chamber 19 and is not a passage that allows constant communication between the lower chamber 20 and the upper chamber 19. The second damping force generation mechanism 173 is in a valve closed state when the piston rod 21 and the piston 18 move to the extension side and does not allow the oil fluid to pass through the second passage 172.

The compression-side second passage 172 that allows communication between the lower chamber 20 and the upper chamber 19 is in parallel with the first passage 72 that is a passage on the compression side that also allows communication between the lower chamber 20 and the upper chamber 19. The first damping force generation mechanism 42 is provided in the first passage 72, and the second damping force generation mechanism 173 is provided in the second passage 172. Therefore, the first damping force generation mechanism 42 and the second damping force generation mechanism 173, which are both on the compression side, are disposed in parallel.

The plurality of discs 84 have an outer diameter smaller than the outer diameter of the discs 101 and substantially the same as an outer diameter of the inner seat part 138 of the valve seat member 105. The disc 110 has an outer diameter larger than an inner diameter of the bottom part 122 of the cap member 108 and smaller than an outer diameter of the bottom part 122. The annular member 111 has a larger diameter than the outer diameter of the disc 110.

The disc 102 and the plurality of discs 101 constitute a sub-valve 181 (first sub-valve) that can be separated from and seated on the valve seat part 139. The disc 102 and the plurality of discs 101 have diameters smaller than the outer diameter of the discs 106 and have a higher rigidity than the discs 106. The sub-valve 181 constituted by the disc 102 and the plurality of discs 101 also has a higher rigidity than the sub-valve 171 constituted by the plurality of discs 106.

The sub-valve 181 is provided in the lower chamber 20, and when it is separated from the valve seat part 139, the upper chamber 19 is allowed to communicate with the lower chamber 20 via the passages in the passage holes 37 of the piston 18, the passage in the notch portion 88 of the disc 82, the passage in the large diameter hole portion 46 of the piston 18, the passages in the passage notch portions 30 of the piston rod 21, the passage in the small diameter hole portion 129 of the valve seat member 105, and the passage in the notch portion 165 of the disc 102. At this time, the sub-valve 181 suppresses a flow of the oil fluid between the sub-valve 181 and the valve seat part 139 to generate a damping force. The sub-valve 181 is a discharge valve that opens when the oil fluid is discharged from the upper chamber 19 to the lower chamber 20 and is a check valve that closes and restricts an inflow of the oil fluid from the lower chamber 20 to the upper chamber 19.

The passages in the passage holes 37 of the piston 18, the passage in the notch portion 88 of the disc 82, the passage in the large diameter hole portion 46 of the piston 18, the passages in the passage notch portions 30 of the piston rod 21, the passage in the small diameter hole portion 129 of the valve seat member 105, the passage in the notch portion 165 of the disc 102, and a passage between the sub-valve 181 and the valve seat part 139 that appears when the valve opens constitute a second passage 182 in which the oil fluid flows out from the upper chamber 19 on the upstream side to the lower chamber 20 on the downstream side in the cylinder 2 due to movement of the piston 18 to the extension side. Here, the second passage 182 includes the passages in the inner passage holes 141 of the valve seat member 105, the passages in the through holes 161 of the discs 106, and the cap chamber 146 that communicate with the passage in the notch portion 165 of the disc 102, or the like.

The second passage 182 is a passage on the extension side through which the oil fluid flows out from the upper chamber 19 on the upstream side toward the lower chamber 20 on the downstream side when the piston 18 moves to the upper chamber 19 side, that is, in the extension stroke. The second passage 182 includes the passages in the passage notch portions 30 formed by cutting out the piston rod 21, in other words, a part thereof is formed by cutting out the piston rod 21.

The sub-valve 181 and the valve seat part 139 are provided in the extension-side second passage 182 to constitute an extension-side second damping force generation mechanism 183 that opens and closes the second passage 182 and suppresses a flow of the oil fluid from the second passage 182 to the lower chamber 20 to generate a damping force. In other words, the valve seat part 139 of the second damping force generation mechanism 183 is provided on the valve seat member 105. The sub-valve 181 constituting the extension-side second damping force generation mechanism 183 is a sub-valve on the extension side.

Also in the second passage 182, the passage in the notch portion 88 of the disc 82 is the orifice 175 that is narrowed in a portion in which a flow path cross-sectional area is fixed, and the passage in the notch portion 165 of the disc 102 is also the orifice 176 that is narrowed in a portion in which a flow path cross-sectional area is fixed. The orifices 175 and 176 are common to the second passages 172 and 182. The orifices 175 and 176 are disposed upstream of the sub-valve 181 in a flow of the oil fluid when the sub-valve 181 opens and the oil fluid flows in the extension-side second passage 182. In the second passage 182, the orifice 175 is disposed on an upstream side in the flow of the oil fluid when the sub-valve 181 opens, and the orifice 176 is disposed on the downstream side. The second passage 182 may have a configuration in which only one of the orifices 175 and 176 is provided.

The orifice 175 is formed by cutting out the disc 82 that is in contact with the piston 18 of the first damping force generation mechanism 41, and the orifice 176 is formed by cutting out the disc 102 that is in contact with the valve seat member 105 of the second damping force generation mechanism 183.

In the second damping force generation mechanisms 173 and 183, the sub-valve 181 is provided on one side of the second passage 172 that is partially formed in the valve seat member 105 and the sub-valve 171 is provided on the other side thereof, and the sub-valve 181 is provided on one side of the second passage 182 that is partially formed in the valve seat member 105 and the sub-valve 171 is provided on the other side thereof. The sub-valve 171 constituted by the plurality of discs 106, the outer valve seat part 136, and the intermediate valve seat part 135, which constitute a part of the second damping force generation mechanism 173, are housed in the cap member 108 which also constitutes a part of the second damping force generation mechanism 173, and the valve seat member 105 and the seal member 103 are also housed in the cap member 108. In other words, the sub-valve 171 constituted by the plurality of discs 106, the valve seat member 105, and the seal member 103 are housed in the cap member 108. Further, at least a part of the second damping force generation mechanisms 173 and 183 may be housed in the cap member 108.

The discs 101 and 102 constituting the sub-valve 181 have a higher rigidity than the discs 106 constituting the sub-valve 171, and the sub-valve 181 has a higher rigidity than the sub-valve 171. Therefore, the sub-valve 171 which is an inflow valve from the lower chamber 20 to the cap chamber 146 has a lower valve opening pressure than the sub-valve 181 which is a discharge valve from the second passage 182 to the lower chamber 20. The sub-valve 181 and the sub-valve 171 open and close independently of each other.

In the extension-side second damping force generation mechanism 183, a fixed orifice that allows communication between the upper chamber 19 and the lower chamber 20 is not formed in either of the valve seat part 139 and the sub-valve 181 in contact with the valve seat part 139 even when they are in contact with each other. That is, the extension-side second damping force generation mechanism 183 does not allow communication between the upper chamber 19 and the lower chamber 20 in a state in which the valve seat part 139 and the sub-valve 181 are in contact with each other over the entire circumference. In other words, the second passage 182 does not include a fixed orifice formed to allow constant communication between the upper chamber 19 and the lower chamber 20 and is not a passage that allows constant communication between the upper chamber 19 and the lower chamber 20. The second damping force generation mechanism 183 is in a valve closed state when the piston rod 21 and the piston 18 move to the compression side and does not allow the oil fluid to pass through the second passage 182.

In the shock absorber 1, at least as a flow of causing the oil fluid to pass in the piston 18 in the axial direction, the upper chamber 19 and the lower chamber 20 can communicate with each other only via the first damping force generation mechanisms 41 and 42 and the second damping force generation mechanisms 173 and 183. Therefore, in the shock absorber 1, a fixed orifice that allows constant communication between the upper chamber 19 and the lower chamber 20 is not provided at least on the passage of the oil fluid that passes in the piston 18 in the axial direction.

The extension-side second passage 182 that allows communication between the upper chamber 19 and the lower chamber 20 is parallel to the first passage 92 which is a passage on the extension side that also allows communication between the upper chamber 19 and the lower chamber 20 except for the passages in the passage holes 37 on the upper chamber 19 side. In this parallel portion, the first damping force generation mechanism 41 is provided in the first passage 92, and the second damping force generation mechanism 183 is provided in the second passage 182. Therefore, the first damping force generation mechanism 41 and the second damping force generation mechanism 183, which are both on the extension side, are disposed in parallel.

The second damping force generation mechanisms 173 and 183 include the valve seat member 105, and the sub-valve 171 provided on one side of the second passages 172 and 182 provided in the valve seat member 105 and the sub-valve 181 provided on the other side thereof. Of the second damping force generation mechanisms 173 and 183, the second damping force generation mechanism 173 includes the bottomed cylindrical cap member 108 that forms the second passage 172. The sub-valve 181 is provided on the lower chamber 20 side of the valve seat member 105, and the sub-valve 171 is provided in the cap chamber 146 between the bottom part 122 of the cap member 108 and the valve seat member 105.

As illustrated in FIG. 1, the base valve 25 described above is provided between the bottom member 12 of the outer tube 4 and the inner tube 3. The base valve 25 includes a base valve member 191 which partitions the lower chamber 20 and the reservoir chamber 6, a disc 192 provided on a lower side of the base valve member 191, that is, on the reservoir chamber 6 side, a disc 193 provided on an upper side of the base valve member 191, that is, on the lower chamber 20 side, and an attachment pin 194 which attaches the disc 192 and the disc 193 to the base valve member 191.

The base valve member 191 has an annular shape, and the attachment pin 194 is inserted through a center thereof in the radial direction. A plurality of passage holes 195 through which the oil fluid can flow between the lower chamber 20 and the reservoir chamber 6, and a plurality of passage holes 196 through which the oil fluid can flow between the lower chamber 20 and the reservoir chamber 6 on an outer side of the passage holes 195 in the radial direction of the base valve member 191 are formed in the base valve member 191. The disc 192 on the reservoir chamber 6 side restricts a flow of the oil fluid from the reservoir chamber 6 to the lower chamber 20 through the passage holes 195 while allowing a flow of the oil fluid from the lower chamber 20 to the reservoir chamber 6 through the passage holes 195. The disc 193 restricts a flow of the oil fluid from the lower chamber 20 to the reservoir chamber 6 through the passage holes 196 while allowing a flow of the oil fluid from the reservoir chamber 6 to the lower chamber 20 through the passage holes 196.

The disc 192, together with the base valve member 191, constitutes a compression-side damping valve mechanism 197 which opens in the compression stroke of the shock absorber 1 to cause the oil fluid to flow from the lower chamber 20 to the reservoir chamber 6 and generate a damping force. The disc 193, together with the base valve member 191, constitutes a suction valve mechanism 198 which opens in the extension stroke of the shock absorber 1 to cause the oil fluid to flow from the reservoir chamber 6 into the lower chamber 20. Further, the suction valve mechanism 198 performs a function of causing the oil fluid to flow from the reservoir chamber 6 to the lower chamber 20 substantially without generating a damping force so that a shortage of the oil fluid caused mainly by extension of the piston rod 21 from the cylinder 2 is supplemented.

Figure 4:
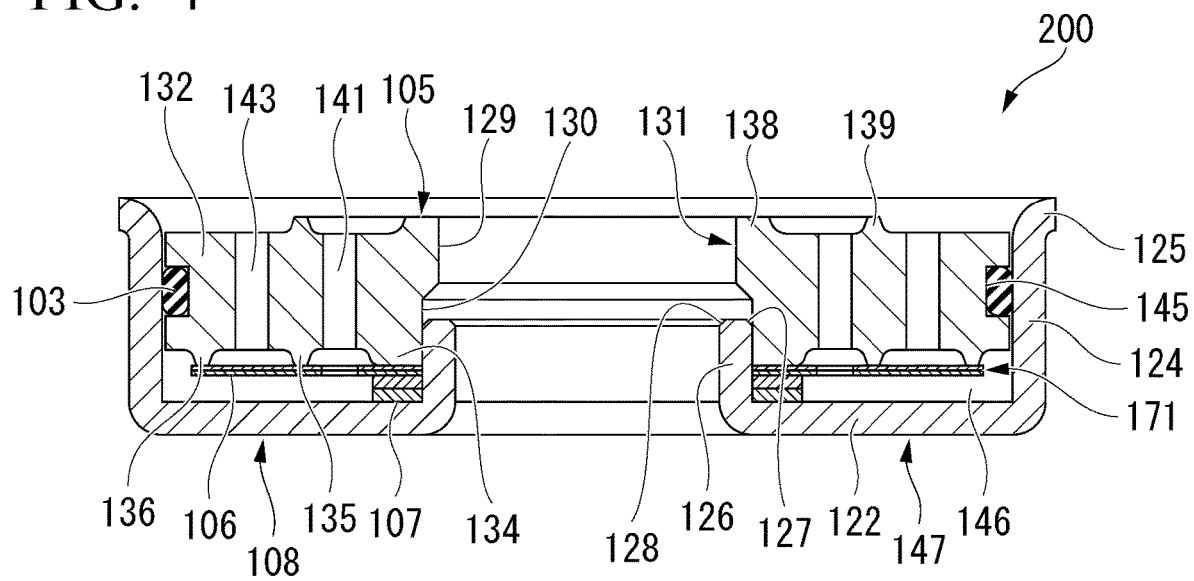
FIG. 4 is a partial cross-sectional view illustrating a sub-assembly such as a cap member and a valve seat member of the shock absorber of the first embodiment according to the present invention.

When the shock absorber 1 is assembled, as illustrated in FIG. 4, the cap member 108, the plurality of discs 107, the plurality of discs 106 constituting the sub-valve 171, the valve seat member 105, and the seal member 103 are pre-assembled to form a sub-assembly 200.

In that case, for example, the plurality of discs 107 are placed on the bottom part 122 of the cap member 108 by fitting the discs 107 to the inner cylindrical part 126 of the cap member 108 with the bottom part 122 positioned at a lower portion in the vertical direction, and furthermore, the plurality of discs 106 are placed on the discs 107 by fitting the discs 106 to the inner cylindrical part 126.

Then, the valve seat member 105 with the seal member 103 mounted in the seal groove 145 is directed so that the inner seat part 134, the intermediate valve seat part 135, and the outer valve seat part 136 face the discs 106 side, an outer circumferential portion of the main body part 132 thereof and an outer circumferential portion of the seal member 103 are inserted into the outer cylindrical part 124 of the cap member 108, and the inner cylindrical part 126 is fitted into the large diameter hole portion 130 while the seal member 103 and the main body part 132 are guided by the outer cylindrical part 124. Then, the valve seat member 105 and the bottom part 122 of the cap member 108 are in a state in which they sandwich the plurality of discs 106 and the plurality of discs 107.

Here, when the outer circumferential portion of the main body part 132 and the outer circumferential portion of the seal member 103 are inserted into the outer cylindrical part 124 of the cap member 108, the opening enlarged diameter part 125 of the cap member 108 guides them to be positioned in the radial direction. Also, when the inner cylindrical part 126 is fitted into the large diameter hole portion 130, the chamfer 127 on the outer circumferential side of the inner cylindrical part 126 guides the valve seat member 105 to be positioned in the radial direction.

When the seal member 103 is inserted into the outer cylindrical part 124 of the cap member 108 while being mounted on the valve seat member 105, the seal member 103 is compressively deformed in the radial direction, applies a reaction force to both the valve seat member 105 and the outer cylindrical part 124, and generates a frictional force between both the valve seat member 105 and the outer cylindrical part 124. In this state, relative axial movement between the valve seat member 105 and the cap member 108 is restricted only by the frictional force of the seal member 103. As a result, since the large diameter hole portion 130 and the inner cylindrical part 126 are maintained in a fitted state, the plurality of discs 106 and the plurality of discs 107 fitted to the inner cylindrical part 126 being come out of the inner cylindrical part 126 is restricted by the valve seat member 105. Therefore, since the plurality of discs 106 and the plurality of discs 107 are maintained in a fitted state to the inner cylindrical part 126, they are positioned in the radial direction with respect to the cap member 108 and maintained in a state in which a positional deviation thereof in the radial direction is restricted.

In this way, the cap member 108, the plurality of discs 107, the plurality of discs 106, the valve seat member 105, and the seal member 103 form an integral sub-assembly 200. In other words, the valve seat member 105 can be sub-assembled to the cap member 108 by the seal member 103 provided on the outer circumference.

As illustrated in FIG. 2, when the piston 18, the sub-assembly 200, and the like are assembled to the piston rod 21, for example, the annular member 67, the disc 66, the disc 65, the plurality of discs 64, the plurality of discs 63, the discs 62, and the piston 18 are stacked in order on the shaft step part 29 while the mounting shaft part 28 of the piston rod 21 with the mounting shaft part 28 positioned at an upper portion in the vertical direction is inserted into each of them. At this time, the piston 18 is directed so that the small diameter hole portion 45 is positioned on the shaft step part 29 side with respect to the large diameter hole portion 46. In addition, the disc 82, the plurality of discs 83, the plurality of discs 84, the plurality of discs 101, and the disc 102 are stacked in order on the piston 18 while the mounting shaft part 28 is inserted into each of them.

Then, while inserting the mounting shaft part 28, the sub-assembly 200 described above is stacked on the disc 102 in the valve seat member 105 with the opening enlarged diameter part 125 directed to face the piston 18 side in the cap member 108. At this time, the inner cylindrical part 126 of the cap member 108 is fitted to the mounting shaft part 28.

Further, the disc 110 and the annular member 111 are stacked in order on the bottom part 122 of the cap member 108 while the mounting shaft part 28 is fitted into each of them. In this state, the nut 112 is screwed onto the male screw 31 of the piston rod 21 protruding further than the annular member 111 so that inner circumferential sides of them are clamped together in the axial direction with the nut 112 and the shaft step part 29.

At this time, the inner cylindrical part 126 of the cap member 108 is not in contact with the valve seat member 105 in the axial direction, and a fastening axial force from the nut 112 is transmitted to the shaft step part 29 via the annular member 111, the disc 110, the bottom part 122 of the cap member 108, the plurality of discs 107, the plurality of discs 106, the inner seat part 134 of the valve seat member 105, the main body part 132, the inner seat part 138, the disc 102, the plurality of discs 101, the plurality of discs 84, the plurality of discs 83, the disc 82, the inner seat part 47 of the piston, the main body part 34, the inner seat part 49, the disc 62, the plurality of discs 63, the plurality of discs 64, the disc 65, the disc 66, and the annular member 67. Therefore, the structure is made such that the inner cylindrical part 126 of the cap member 108 is avoided from the axial force transmission path and an end portion of the inner cylindrical part 126 on a side opposite to the bottom part 122 is not used for the axial force transmission.

In this state, an inner circumferential side of the main valve 71 is clamped by the inner seat part 49 of the piston 18 and the disc 65 via the disc 62, and an outer circumferential side thereof is in contact with the valve seat part 50 of the piston 18 over the entire circumference. Also, in this state, an inner circumferential side of the main valve 91 is clamped by the inner seat part 47 of the piston 18 and the disc 84 via the disc 82, and an outer circumferential side thereof is in contact with the valve seat part 48 of the piston 18 over the entire circumference. Also, in this state, an inner circumferential side of the sub-valve 181 is clamped by the inner seat part 138 of the valve seat member 105 and the disc 84, and an outer circumferential side thereof is in contact with the valve seat part 139 of the valve seat member 105 over the entire circumference. Also, in this state, an inner circumferential side of the sub-valve 171 is clamped by the inner seat part 134 and the disc 107 of the valve seat member 105, and an outer circumferential side thereof is in contact with the intermediate valve seat part 135 and the outer valve seat part 136 of the valve seat member 105 over the entire circumference.

Here, of the first damping force generation mechanism 41 and the second damping force generation mechanism 183 which are both on the extension side, the main valve 91 of the first damping force generation mechanism 41 has a higher rigidity and a higher valve opening pressure than the sub-valve 181 of the second damping force generation mechanism 183. Therefore, in the extension stroke, in an extremely low speed region at a low speed in which a piston speed is equal to or lower than a predetermined value, the second damping force generation mechanism 183 opens the valve while the first damping force generation mechanism 41 is in a valve closed state. Also, in a normal speed region in which the piston speed is higher than the predetermined value, both the first damping force generation mechanism 41 and the second damping force generation mechanism 183 are opened. The sub-valve 181 is an extremely low speed valve that opens in a region in which the piston speed is extremely low and generates a damping force.

That is, in the extension stroke, although a pressure of the upper chamber 19 increases and a pressure of the lower chamber 20 decreases as the piston 18 moves to the upper chamber 19 side, since none of the first damping force generation mechanisms 41 and 42 and the second damping force generation mechanisms 173 and 183 has a fixed orifice, the oil fluid does not flow until the second damping force generation mechanism 183 opens. Therefore, the damping force rises sharply at a piston speed less than a first predetermined value in the extension stroke. Also, when the piston speed is in a region equal to or higher than the first predetermined value in which the second damping force generation mechanisms 183 opens and in an extremely low speed region at a low speed equal to or lower than a second predetermined value that is higher speed than the first predetermined value, the second damping force generation mechanism 183 opens the valve while the first damping force generation mechanism 41 is in a valve closed state.

That is, the sub-valve 181 is separated from the valve seat part 139 to cause the upper chamber 19 and the lower chamber 20 to communicate with each other through the extension-side second passage 182. Therefore, the oil fluid in the upper chamber 19 flows to the lower chamber 20 via the passages in the passage holes 37 of the piston 18, the orifice 175, the passage in the large diameter hole portion 46 of the piston 18, the passages in the passage notch portions 30 of the piston rod 21, the passage in the small diameter hole portion 129 of the cap member 108, the orifice 176, and the passage between the sub-valve 181 and the valve seat part 139. Thereby, even in the extremely low speed region in which the piston speed is equal to or lower than the second predetermined value, a damping force of the valve characteristic (a characteristic in which the damping force is substantially proportional to the piston speed) can be obtained.

Also, in the extension stroke, in a normal speed region in which the piston speed is higher than the second predetermined value, the first damping force generation mechanism 41 opens the valve while the second damping force generation mechanism 183 remains in a valve open state.

That is, the sub-valve 181 is separated from the valve seat part 139 to cause the oil fluid to flow from the upper chamber 19 to the lower chamber 20 through the extension-side second passage 182. At this time, when a flow of the oil fluid is decreased by the orifices 175 and 176 provided downstream side of the main valve 91 in the second passage 182, a pressure applied to the main valve 91 increases, a differential pressure increases, and thereby the main valve 91 is separated from the valve seat part 48 to cause the oil fluid to flow from the upper chamber 19 to the lower chamber 20 through the extension-side first passage 92. Therefore, the oil fluid in the upper chamber 19 flows to the lower chamber 20 through the passages in the passage holes 37 and the passage between the main valve 91 and the valve seat part 48. Thereby, even in the normal speed region in which the piston speed is higher than the second predetermined value, a damping force of the valve characteristic (the damping force is substantially proportional to the piston speed) can be obtained.

Here, in the extension stroke, although the differential pressure between the upper chamber 19 and the lower chamber 20 in the normal speed region in which the piston speed is higher than the second predetermined value is larger than that in the extremely low speed region in which the piston speed is equal to or higher than the first predetermined value and equal to or lower than the second predetermined value, since the first passage 92 is not narrowed by an orifice, the oil fluid can be caused to flow through the first passage 92 at a high flow rate when the main valve 91 opens. In addition to this, when the second passage 182 is narrowed by the orifices 175 and 176, deformation of the sub-valve 181 can be suppressed.

Also, at this time, a pressure in an opposite direction is applied to the sub-valve 171 in a closed state from the lower chamber 20 and the cap chamber 146. Even when the pressure difference between the upper chamber 19 and the lower chamber 20 increases, since the orifices 175 and 176 are formed upstream of the sub-valve 171 in the second passage 182, an increase in pressure of the cap chamber 146 becomes gentle with respect to an increase in pressure of the upper chamber 19, and a pressure difference between the cap chamber 146 and the lower chamber 20 is inhibited from becoming large. Therefore, the pressure difference between the cap chamber 146 and the lower chamber 20 received by the sub-valve 171 in a closed state is inhibited from becoming large, and a large back pressure from the cap chamber 146 side toward the lower chamber 20 side can be inhibited from being applied to the sub-valve 171.

In the shock absorber 1, the first passage 92 and the second passage 182 which are flow paths for causing the oil fluid to flow from the upper chamber 19 to the lower chamber 20 in the extension stroke are provided in parallel, and the main valve 91 and a sub-valve 181 are provided in parallel. Also, the orifices 175 and 176 are connected in series to the sub-valve 181.

As described above, in the extension stroke, in the normal speed region in which the piston speed is higher than the second predetermined value, the oil fluid can be caused to flow at a high flow rate through the first passage 92 when the main valve 91 opens. Thereby, a flow rate flowing through the second passage 182 between the sub-valve 181 and the valve seat part 139 is reduced. Therefore, a valve rigidity of the sub-valve 181 can be reduced. Therefore, for example, reduction in a rate of increase in the damping force with respect to an increase in the piston speed when the piston speed is in the normal speed region, or the like can be achieved. In other words, a slope of the rate of increase in the damping force on the extension side with respect to the increase in piston speed in the normal speed region can be laid down more than that in the extremely low speed region. Thereby, the degree of freedom in design can be expanded.

Of the first damping force generation mechanism 42 and the second damping force generation mechanism 173 which are both on the compression side, the main valve 71 of the first damping force generation mechanism 42 has a higher rigidity and a higher valve opening pressure than the sub-valve 171 of the second damping force generation mechanism 173. Therefore, in the compression stroke, in the extremely low speed region at a low speed in which the piston speed is equal to or lower than the predetermined value, the second damping force generation mechanism 173 opens the valve while the first damping force generation mechanism 42 is in a valve closed state, and in the normal speed region in which the piston speed is higher than the predetermined value, both the first damping force generation mechanism 42 and the second damping force generation mechanism 173 open the valves. The sub-valve 171 is an extremely low speed valve that opens in a region in which the piston speed is extremely low and generates a damping force.

That is, in the compression stroke, although a pressure of the lower chamber 20 increases and a pressure of the upper chamber 19 decreases as the piston 18 moves to the lower chamber 20 side, since none of the first damping force generation mechanisms 41 and 42 and the second damping force generation mechanisms 173 and 183 has a fixed orifice, the oil fluid does not flow until the second damping force generation mechanism 173 opens the valve. Therefore, the damping force rises sharply.

When the piston speed is in a region equal to or higher than a third predetermined value in which the second damping force generation mechanisms 173 opens the valve and in an extremely low speed region at a low speed equal to or lower than a fourth predetermined value that is higher speed than the third predetermined value, the second damping force generation mechanism 173 opens the valve while the first damping force generation mechanism 42 is in a valve closed state.

That is, the sub-valve 171 is separated from the outer valve seat part 136 to allow communication between the lower chamber 20 and the upper chamber 19 through the compression-side second passage 172. Therefore, the oil fluid in the lower chamber 20 flows to the upper chamber 19 via the passages in the outer passage holes 143, the passage between the sub-valve 171 and the outer valve seat part 136, the cap chamber 146, the passages in the through holes 161 of the sub-valve 171, the passages in the inner passage holes 141, the orifice 176, the passage in the small diameter hole portion 129 of the valve seat member 105, the passages in the passage notch portions 30 of the piston rod 21, the passage in the large diameter hole portion 46 of the piston 18, the orifice 175, and the passages in the passage holes 37 of the piston 18. Thereby, even in the extremely low speed region at a low speed in which the piston speed is equal to or lower than the fourth predetermined value, a damping force of the valve characteristic (a characteristic in which the damping force is substantially proportional to the piston speed) can be obtained.

Also, in the compression stroke, in the normal speed region in which the piston speed is higher than the fourth predetermined value described above, the first damping force generation mechanism 42 opens the valve while the second damping force generation mechanism 173 remains in a valve open state. That is, the sub-valve 171 is separated from the outer valve seat part 136 to cause the oil fluid to flow from the lower chamber 20 to the upper chamber 19 through the compression-side second passage 172. At this time, since a flow rate of the oil fluid is reduced by the orifices 176 and 175 in the second passage 172, a differential pressure generated in the main valve 71 increases, and the main valve 71 is separated from the valve seat part 50 to cause the oil fluid to flow from the lower chamber 20 to the upper chamber 19 through the compression-side first passage 72. Therefore, the oil fluid in the lower chamber 20 flows through the passages in the passage holes 39 and the passage between the main valve 71 and the valve seat part 50. Thereby, even in the normal speed region in which the piston speed is higher than the fourth predetermined value, a damping force of the valve characteristic (the damping force is substantially proportional to the piston speed) can be obtained.

Here, a rate of increase in the damping force on the compression side with respect to an increase in the piston speed in the normal speed region is lower than a rate of increase in the damping force on the compression side with respect to an increase in the piston speed in the extremely low speed region. In other words, a slope of the rate of increase of the damping force on the compression side with respect to the increase of piston speed in the normal speed region can be laid down more than that in the extremely low speed region.

In the compression stroke, although the differential pressure between the lower chamber 20 and the upper chamber 19 in the normal speed region in which the piston speed is higher than the fourth predetermined value is larger than that in the extremely low speed region, since the first passage 72 is not narrowed by an orifice, the oil fluid can be caused to flow through the first passage 72 at a high flow rate when the main valve 71 opens. Thereby, since the flow rate flowing through the sub-valve 171 is reduced, a valve rigidity of the sub-valve 171 can be reduced. Therefore, reduction in damping force when the piston speed is in the normal speed region, or the like can be achieved, and the degree of freedom in design can be expanded.

Also, at this time (when the piston speed is high), although the differential pressure between the lower chamber 20 and the upper chamber 19 increases, when the second passage 172 is narrowed by the orifices 176 and 175, since a pressure in the cap chamber 146 communicating with the upper chamber 19 via the orifices 176 and 175 is the pressure between the lower chamber 20 and the upper chamber 19, the differential pressure between the lower chamber 20 and the upper chamber 19 can be inhibited from becoming too large.

In addition to this, the oil fluid can be caused to flow at a high flow rate through the first passage 72 when the main valve 71 opens, and thereby deformation of the sub-valve 171 can be suppressed.

Also, at this time, although a pressure in an opposite direction is applied to the sub-valve 181 in a closed state from the lower chamber 20 and the cap chamber 146, and while the pressure difference between the lower chamber 20 and the upper chamber 19 is large, since the lower chamber 20 and the cap chamber 146 communicate with each other due to opening of the sub-valve 171, and the orifices 176 and 175 are provided between the cap chamber 146 on the downstream side of the sub-valve 181 and the upper chamber 19, the pressure in the cap chamber 146 can be inhibited from decreasing too much and the pressure in the cap chamber 146 can be increased in accordance with an increase in pressure of the lower chamber 20. Therefore, a differential pressure generated on surfaces of the sub-valve 181 on the upstream side and downstream side is small, and a large back pressure from the lower chamber 20 side toward the cap chamber 146 side can be inhibited from being applied to the sub-valve 181.

In the shock absorber 1 described above, the first passage 72 and the second passage 172 are provided in parallel as flow paths for causing the oil fluid to flow from the lower chamber 20 to the upper chamber 19 in the compression stroke, and the main valve 71 and the sub-valve 171 are provided in parallel. Also, the orifices 176 and 175 are connected in series to the sub-valve 171 in the second passage 172.

Further, in the compression stroke, the damping force characteristic due to the damping valve mechanism 197 of the base valve 25 is also combined.

In the extension stroke, although the differential pressure between the upper chamber 19 and the lower chamber 20 in the normal speed region in which the piston speed is higher than the second predetermined value is larger than that in the extremely low speed region in which the piston speed is equal to or lower than the second predetermined value, since an increase in pressure of the cap chamber 146 can be suppressed by the orifices 176 and 175 formed upstream of the sub-valve 171, deformation of the sub-valve 171 due to the back pressure can be suppressed. Also, in the compression stroke, although the differential pressure between the lower chamber 20 and the upper chamber 19 in the normal speed region in which the piston speed is higher than the fourth predetermined value is larger than that in the extremely low speed region in which the piston speed is equal to or lower than the fourth predetermined value, when the oil fluid is caused to flow at a high flow rate through the first passage 72 and a downstream side of the sub-valve 171 of the second passage 172 is narrowed by the orifices 176 and 175, deformation of the sub-valve 171 can be suppressed. Therefore, the durability of the sub-valve 171 can be improved.

In the extension stroke, although the differential pressure between the upper chamber 19 and the lower chamber 20 in the normal speed region in which the piston speed is higher than the second predetermined value is larger than that in the extremely low speed region in which the piston speed is equal to or lower than the second predetermined value, when the oil fluid is caused to flow at a high flow rate through the first passage 92 and the second passage 182 is narrowed by the orifices 175 and 176, deformation of the sub-valve 181 can be suppressed. Also, in the compression stroke, the differential pressure between the lower chamber 20 and the upper chamber 19 increases in the normal speed region in which the piston speed is higher than the fourth predetermined value, but the lower chamber 20 and the cap chamber 146 communicate with each other due to opening of the sub-valve 171, and moreover, a flow of the oil fluid from the cap chamber 146 to the upper chamber 19 is reduced by the orifices 176 and 175 provided between the cap chamber 146 and the upper chamber 19. Therefore, the differential pressure between the lower chamber 20 and the cap chamber 146 is small, and deformation of the sub-valve 181 due to the back pressure can be suppressed. Therefore, the durability of the sub-valve 181 can be improved.

Since the second damping force generation mechanisms 173 and 183 that are independent of each other in the compression stroke and the extension stroke are provided, a degree of freedom in setting the damping force characteristics is increased.

The above-described Patent Literatures 1 to 3 describe those having two valves that open in the same stroke, but the number of parts increases. Then, productivity decreases.

The shock absorber 1 of the first embodiment includes the first damping force generation mechanism 41 provided in the extension-side first passage 92 formed in the piston 18 and configured to generate a damping force, and the second damping force generation mechanism 183 provided in the extension-side second passage 182 which is parallel to the first passage 92 and provided in the annular valve seat member 105 disposed in the lower chamber 20 to generate a damping force. Also, the shock absorber 1 of the first embodiment includes the first damping force generation mechanism 42 provided in the compression-side first passage 72 formed in the piston 18 and configured to generate a damping force, and the second damping force generation mechanism 173 provided in the compression-side second passage 172 which is parallel to the first passage 72 and provided in the annular valve seat member 105 disposed in the lower chamber 20 to generate a damping force. Even in such a configuration with a large number of parts, the second damping force generation mechanisms 173 and 183 are configured to include the sub-valve 181 provided on one side of the second passages 172 and 182 formed in the valve seat member 105 and the sub-valve 171 provided on the other side thereof, and the bottomed cylindrical cap member 108 having the outer cylindrical part 124 and the bottom part 122, and the inner cylindrical part 126 into which the piston rod 21 can be inserted is formed on the inner circumferential side of the bottom part 122 of the cap member 108 to house the sub-valve 171 which is a part of the second damping force generation mechanism 173. Thereby, since the sub-valve 171 can be housed in the cap member 108 in advance and then the piston rod 21 can be inserted into the inner cylindrical part 126, productivity can be improved. Therefore, reduction in costs can be achieved. Also, since automatic assembly is possible, productivity can be further improved with automatic assembly, and reduction in costs and reduction in an incidence of defective products can be achieved.

Also, since positioning, that is centering, of the sub-valve 171 in the radial direction with respect to the cap member 108 is possible using the inner cylindrical part 126 of the cap member 108, the sub-valve 171 does not deviate even in a sub-assembled state. Thereby, since the automatic assembly is further facilitated, productivity can be further improved.

Also, since the structure is configured such that the sub-valve 171 and the valve seat member 105 are housed in the cap member 108, and the valve seat member 105 is sub-assembled to the cap member 108 by the seal member 103 provided on the outer circumference, productivity of sub-assembly can be improved compared to a case in which press-fitting, swaging, or the like is performed.

Also, since the cap member 108 is formed by press forming, productivity of the cap member 108 can be improved.

Patent Literature 3 described above describes that two oil chambers are connected with flow paths in parallel, valves are provided in the flow paths, and thereby valves that open in the same stroke are disposed in parallel. When such a structure in which valves that open in the same stroke are disposed in parallel as described above is employed, one valve can be opened in a region in which a piston speed thereof is lower than that of the other valve, and both the valves can be opened in a region in which the piston speed is higher than that. In such a structure, the durability of the valve, particularly on the low-speed side, is required to be improved.

In contrast, in the shock absorber 1 of the first embodiment, the sub-valves 171 and 181 of the second damping force generation mechanisms 173 and 183 of the second passages 172 and 182 parallel to the first passages 72 and 92 of the piston 18 in which the first damping force generation mechanisms 41 and 42 are provided are provided in the valve seat member 105 disposed in the lower chamber 20. At the same time, the bottomed cylindrical cap member 108 is provided between the piston 18 and the valve seat member 105 in the second passages 172 and 182 with the valve seat member 105 disposed on the inner side of the cap member 108. At this time, the sub-valve 181 is provided on the lower chamber 20 side, and the sub-valve 171 is provided in the cap chamber 146 between the bottom part 122 of the cap member 108 and the valve seat member 105. Then, the orifices 175 and 176 are disposed on an upstream side of the flow at the time of the extension stroke in which the sub-valve 181 of the second passage 182 is opened. Thereby, in the compression stroke, a flow of the oil fluid flowing from the lower chamber 20 into the cap chamber 146 by opening the sub-valve 171 and then flowing to the upper chamber 19 is reduced by the orifices 175 and 176. Therefore, a differential pressure between the cap chamber 146 and the lower chamber 20 decreases, and the sub-valve 181 in a closed state that receives a back pressure from the lower chamber 20 receives the same pressure as the lower chamber 20 from the cap chamber 146, and thereby the received back pressure (differential pressure) is reduced. Therefore, the durability of the sub-valve 181 can be improved.

Also, since the structure is configured such that the piston rod 21 is inserted into the piston 18, the cap member 108, and the valve seat member 105, the piston 18, the cap member 108, and the valve seat member 105 can be compactly disposed.

Since the orifice 175 is formed by cutting out the disc 82 of the extension-side first damping force generation mechanism 41 that is in contact with the piston 18, the orifice 175 can be easily formed.

Since the orifice 176 is formed by cutting out the disc 102 of the extension-side second damping force generation mechanism 183 that is in contact with the valve seat member 105, the orifice 176 can be easily formed.

Since parts of the second passages 172 and 182 are formed by cutting out the piston rod 21, the second passages 172 and 182 can be easily formed.

Since the sub-valve 171, which is an inflow valve into the cap chamber 146, has a lower valve opening pressure than the sub-valve 181, the oil fluid easily flows from the lower chamber 20 into the cap chamber 146 by opening the sub-valve 171 at the time of compression stroke. Therefore, in a state in which the lower chamber 20 has a lower pressure, the sub-valve 181 in a closed state receives the same pressure as the lower chamber 20 from the cap chamber 146, and the received back pressure is reduced. Therefore, the durability of the sub-valve 181 can be further improved.

Also, since the differential pressure between the cap chamber 146 and the lower chamber 20 does not increase in both the expansion and compression strokes, pressed parts of a thin plate can be used for the cap member 108, and it is advantageous in terms of manufacturability and weight reduction.

Also, the degree of freedom in setting the orifice increases due to the two orifices in series including the orifice 175 and the orifice 176.

Further, in the first embodiment, the sub-assembly 200 and the sub-valve 181 may also be attached in a direction opposite to the above in the axial direction. In that case, the bottom part 122 of the cap member 108 of the sub-assembly 200 is brought into contact with the discs 84, the sub-valve 181 is disposed on a side of the sub-assembly 200 opposite to the discs 84, and a plurality of discs similar to the discs 84 are provided between the sub-valve 181 and the disc 110 to secure a deformation allowance of the sub-valve 181. Then, the passages in the passage notch portions 30 of the piston rod 21 are caused to communicate with the passage in the through hole 131.

Second Embodiment

Next, a second embodiment will be described mainly on the basis of FIG. 5, focusing on the differences from the first embodiment. Incidentally, parts common to those in the first embodiment will be denoted by the same terms and the same reference signs.

Figure 5:
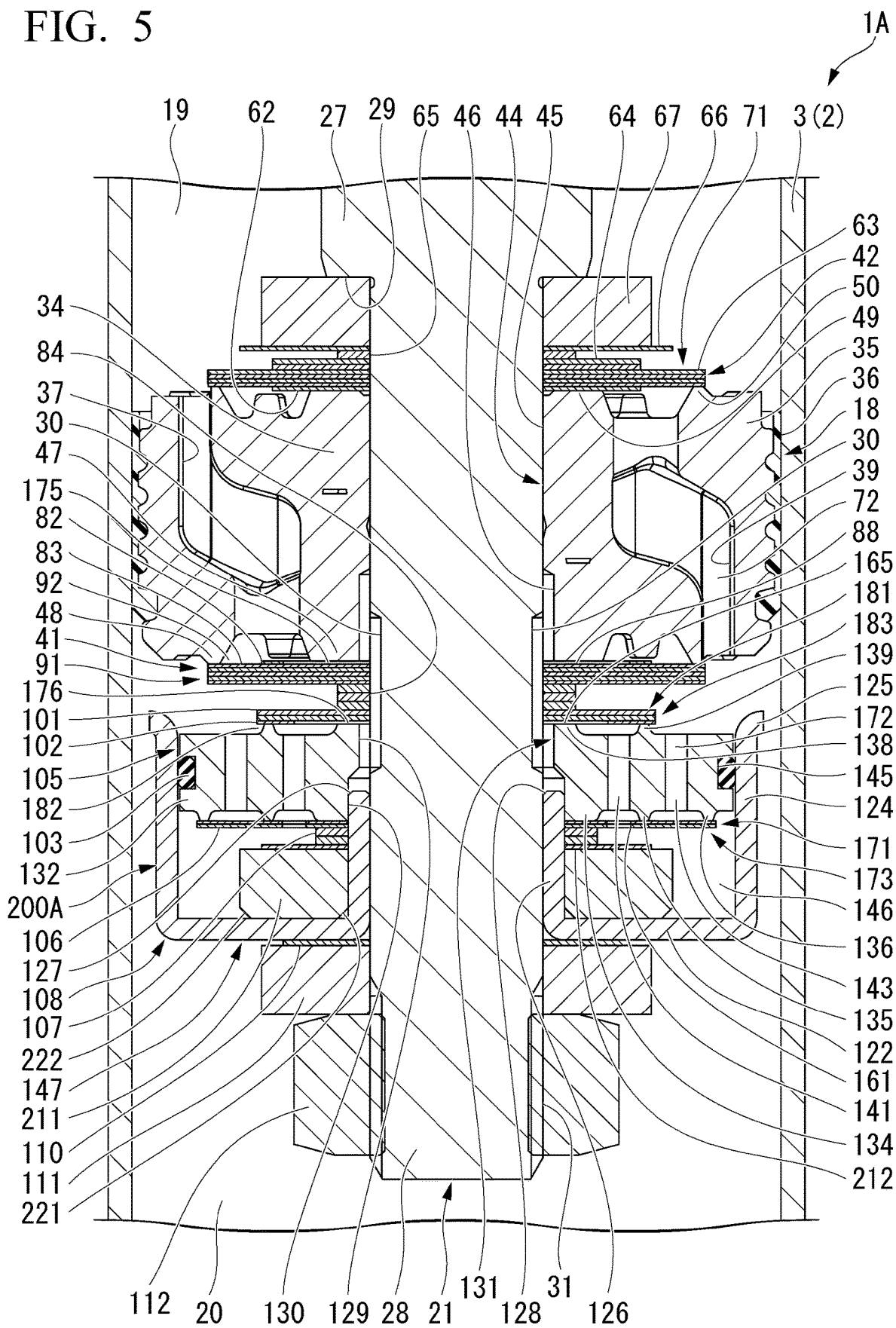
FIG. 5 is a partial cross-sectional view illustrating surroundings of a piston of a shock absorber of a second embodiment according to the present invention.

In a shock absorber 1A of the second embodiment, as illustrated in FIG. 5, axial lengths of an outer cylindrical part 124 and an inner cylindrical part 126 of a cap member 108 are larger than those of the first embodiment.

And, a washer 211 and a disc 212 are provided between a bottom part 122 and a disc 107 of the cap member 108. The washer 211 and the disc 212 are made of a metal and both have a bored disc shape into which the inner cylindrical part 126 of the cap member 108 can be fitted on an inner side. The washer 211 and the disc 212 are fitted to the inner cylindrical part 126 to be positioned in a radial direction with respect to the inner cylindrical part 126.

The disc 212 has a bored circular flat plate shape having a constant thickness and has an outer diameter larger than an outer diameter of the disc 107 and smaller than an outer diameter of a disc 106.

The washer 211 includes a chamfer 221 formed over the entire circumference on an inner circumferential edge portion on one side in an axial direction, and a chamfer 222 formed over the entire circumference on an outer circumferential edge portion on the same one side in the axial direction. The chamfers 221 and 222 are each formed so that a cross section thereof in a plane including a central axis of the washer 211 is linear. Further, the chamfers 221, 222 may also be formed so that a cross section thereof in a plane including the central axis of the washer 211 has an arc shape. The washer 211 has a bored circular flat plate shape having a constant thickness except for the chamfers 221 and 222. A side of the washer 211 on which the axial chamfers 211 and 222 are formed is in contact with the bottom part 122 of the cap member 108, and a side thereof on which the axial chamfers 211 and 222 are not formed is in contact with the disc 212. The washer 211 has an outer diameter larger than an outer diameter of the disc 212 and smaller than the outer diameter of the disc 106.

In the second embodiment, in addition to a plurality of discs 106, a plurality of discs 107, a valve seat member 105, and a seal member 103 similar to those of the first embodiment housed in the cap member 108, the washer 211 and the disc 212 are further housed in the cap member 108. An axial length of the cap member 108 is larger than that of the first embodiment by thicknesses of the washer 211 and the disc 212.

An axial length of a mounting shaft part 28 of a piston rod 21 is also larger than that of the first embodiment to correspond to the axial length of the cap member 108 that is increased as described above to provide the washer 211 and the disc 212 between the bottom part 122 and the discs 107 of the cap member 108.

When the shock absorber 1A of the second embodiment is assembled, the cap member 108, the washer 211, the disc 212, the plurality of discs 107, the plurality of discs 106 constituting a sub-valve 171, the valve seat member 105, and the seal member 103 are pre-assembled to form a sub-assembly 200A.

In that case, for example, the washer 211 is brought into contact with the bottom part 122 of the cap member 108 on the chamfers 221 and 222 side in the axial direction by fitting the washer 211 to the inner cylindrical part 126 of the cap member 108 with the bottom part 122 positioned at a lower portion in the vertical direction, and in addition, the disc 212 is placed on the washer 211 by fitting the disc 212 to the inner cylindrical part 126. Further, the plurality of discs 107 are fitted to the inner cylindrical part 126 to place the discs 107 on the disc 212, and in addition, the plurality of discs 106 are fitted to the inner cylindrical part 126 to place the discs 106 on the discs 107.

Then, the valve seat member 105 with the seal member 103 mounted in a seal groove 145 is directed so that an inner seat part 134, an intermediate valve seat part 135, and an outer valve seat part 136 face the discs 106 side, an outer circumferential portion of a main body part 132 of the valve seat member 105 and an outer circumferential portion of the seal member 103 are fitted into the outer cylindrical part 124 of the cap member 108, and a large diameter hole portion 130 is fitted to the inner cylindrical part 126 while the main body part 132 is guided by the outer cylindrical part 124. Then, the valve seat member 105 and the bottom part 122 of the cap member 108 are in a state in which they sandwich the plurality of discs 106, the plurality of discs 107, the disc 212, and the washer 211. In other words, the washer 211 is provided between the bottom part 122 and the sub-valve 171 constituted by the discs 106 in the cap member 108.

When the seal member 103 is inserted into the outer cylindrical part 124 of the cap member 108 while being mounted on the valve seat member 105, a frictional force is generated between both the valve seat member 105 and the outer cylindrical part 124 to restrict relative axial movement of the valve seat member 105 and the cap member 108 as in the first embodiment. As a result, since the large diameter hole portion 130 and the inner cylindrical part 126 are maintained in a fitted state, the plurality of discs 106, the plurality of discs 107, the disc 212, and the washer 211 fitted to the inner cylindrical part 126 being come out of the inner cylindrical part 126 is restricted by the valve seat member 105. Therefore, since the plurality of discs 106, the plurality of discs 107, the disc 212, and the washer 211 are maintained in a fitted state to the inner cylindrical part 126, they are positioned in the radial direction with respect to the cap member 108 and maintained in a state in which a positional deviation thereof in the radial direction is restricted. In this way, the cap member 108, the washer 211, the disc 212, the plurality of discs 107, the plurality of discs 106, the valve seat member 105, and the seal member 103 form the integral sub-assembly 200A.

When a piston 18, the sub-assembly 200A, and the like are assembled to the piston rod 21, for example, similarly to the first embodiment, an annular member 67, a disc 66, a disc 65, a plurality of discs 64, a plurality of discs 63, a disc 62, the piston 18, a disc 82, a plurality of discs 83, a plurality of discs 84, a plurality of discs 101, and a disc 102 are stacked in order on a shaft step part 29 while the mounting shaft part 28 of the piston rod 21 with the mounting shaft part 28 positioned at an upper portion in the vertical direction is fitted into each of them.

Then, while the mounting shaft part 28 is fitted therein, the sub-assembly 200A described above is stacked on the disc 102 in the valve seat member 105 with an opening enlarged diameter part 125 directed to face the piston 18 side in the cap member 108. At this time, the inner cylindrical part 126 of the cap member 108 is fitted to the mounting shaft part 28.

Further, a disc 110 and an annular member 111 are stacked in order on the bottom part 122 of the cap member 108 while the mounting shaft part 28 is fitted into each of them. In this state, a nut 112 is screwed onto a male screw 31 of the piston rod 21 protruding further than the annular member 111 so that inner circumferential sides of them are clamped together in the axial direction with the nut 112 and the shaft step part 29.

Also at this time, the inner cylindrical part 126 of the cap member 108 is not in contact with the valve seat member 105 in the axial direction, and a fastening axial force from the nut 112 is transmitted to the shaft step part 29 via the annular member 111, the disc 110, the bottom part 122 of the cap member 108, the washer 211, the disc 212, the plurality of discs 107, the plurality of discs 106, the inner seat part 134 of the valve seat member 105, the main body part 132, the inner seat part 138, the disc 102, the plurality of discs 101, the plurality of discs 84, the plurality of discs 83, the disc 82, an inner seat part 47 of the piston, a main body part 34, an inner seat part 49, the disc 62, the plurality of discs 63, the plurality of discs 64, the disc 65, the disc 66, and the annular member 67.

In such a shock absorber 1A of the second embodiment, since the washer 211 having the chamfer 221 formed on an inner circumferential side thereof is in contact with the bottom part 122 of the cap member 108 on the chamfer 221 side, even when a bending accuracy of a boundary portion between the bottom part 122 and the inner cylindrical part 126 is low, this portion can be avoided by the chamfer 221. Thereby, even when the bending accuracy of the boundary portion between the bottom part 122 and the inner cylindrical part 126 of the cap member 108 is low, floating of the parts placed on the bottom part 122 in the axial direction can be suppressed. Thereby, the fastening axial force of the nut 112 can be sufficiently and stably generated. Therefore, damping forces of first damping force generation mechanisms 41 and 42 and second damping force generation mechanisms 173 and 183 can be inhibited from becoming unstable. In other words, a processing accuracy of the cap member 108 can be relaxed, and the productivity of the cap member 108 can be improved.

Also in the second embodiment, as described in the first embodiment, the sub-assembly 200A and a sub-valve 181 can be attached in a direction opposite to the above in the axial direction while securing a deformation allowance of the sub-valve 181 using the same discs as the discs 84.

Third Embodiment

Next, a third embodiment will be described mainly on the basis of FIG. 6, focusing on the differences from the first embodiment. Incidentally, parts common to those in the first embodiment will be denoted by the same terms and the same reference signs.

Figure 6:
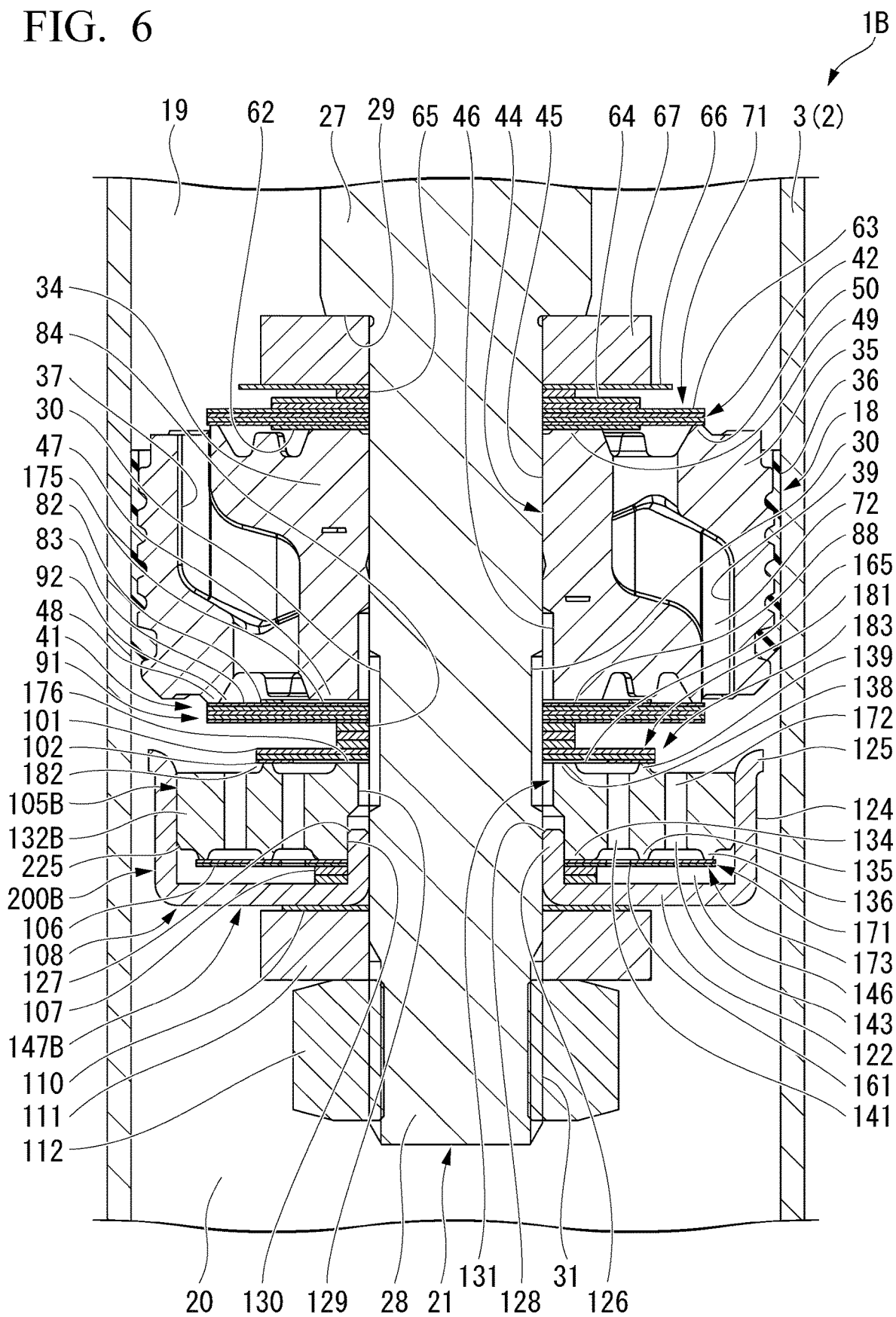
FIG. 6 is a partial cross-sectional view illustrating surroundings of a piston of a shock absorber of a third embodiment according to the present invention.

In a shock absorber 1B of the third embodiment, as illustrated in FIG. 6, a valve seat member 105B which is partially different from the valve seat member 105 of the first embodiment is provided instead of the valve seat member 105. The valve seat member 105B includes a main body part 132B having a larger outer diameter than the main body part 132 of the first embodiment while the seal groove 145 of the first embodiment is not formed therein. The outer diameter of the main body part 132B is an outer diameter that is fitted into an outer cylindrical part 124 of a cap member 108 with a fastening allowance by press-fitting. A chamfer 225 is formed over the entire circumference on an outer circumferential edge portion in an axial direction of the valve seat member 105B on an outer valve seat part 136 side.

A plurality of discs 106, a plurality of discs 107, and the valve seat member 105B are housed in the cap member 108. The cap member 108 and the valve seat member 105B constitute a housing 147B.

When the shock absorber 1B of the third embodiment is assembled, the cap member 108, the plurality of discs 107, the plurality of discs 106 constituting a sub-valve 171, and the valve seat member 105B are pre-assembled to form a sub-assembly 200B.

In that case, for example, the plurality of discs 107 are placed on the bottom part 122 of the cap member 108 by fitting the discs 107 to an inner cylindrical part 126 of the cap member 108 with the bottom part 122 positioned at a lower portion in the vertical direction, and the plurality of discs 106 are placed on the discs 107 by fitting the discs 106 to the inner cylindrical part 126.

Then, the valve seat member 105B is directed so that an inner seat part 134, an intermediate valve seat part 135, and the outer valve seat part 136 face the discs 106 side, an outer circumferential portion of the main body part 132B of the valve seat member 105B is fitted into the outer cylindrical part 124 of the cap member 108 by press-fitting, and a large diameter hole portion 130 is fitted to the inner cylindrical part 126 while the main body part 132B is guided by the outer cylindrical part 124. Then, the valve seat member 105B and the bottom part 122 of the cap member 108 sandwich the plurality of discs 106 and the plurality of discs 107.

Further, when the outer circumferential portion of the main body part 132B is fitted into the outer cylindrical part 124 of the cap member 108 by press-fitting, an opening enlarged diameter part 125 of the cap member 108 and the chamfer 225 of the main body part 132B guide the outer circumferential portion of the main body part 132B to be positioned in a radial direction. When the valve seat member 105B is fitted into the outer cylindrical part 124 by press-fitting, a space between the valve seat member 105B and the outer cylindrical part 124 is hermetically sealed. In this state, the sub-valve 171 constituted by the discs 106 and the valve seat member 105B are housed in the cap member 108.

When the valve seat member 105B is press-fitted into the outer cylindrical part 124 in this way, the valve seat member 105B and the cap member 108 are fixed while relative axial movement and relative radial movement are restricted. Also at this time, since the large diameter hole portion 130 and the inner cylindrical part 126 are maintained in a fitted state, the plurality of discs 106 and the plurality of discs 107 fitted to the inner cylindrical part 126 being come out of the inner cylindrical part 126 is restricted by the valve seat member 105B. Therefore, since the plurality of discs 106 and the plurality of discs 107 are maintained in a fitted state to the inner cylindrical part 126, they are positioned in the radial direction with respect to the cap member 108 and maintained in a state in which a positional deviation thereof in the radial direction is restricted. In this way, the cap member 108, the plurality of discs 107, the plurality of discs 106, and the valve seat member 105B form the integral sub-assembly 200B.

When a piston 18, the sub-assembly 200B, and the like are assembled to a piston rod 21, for example, similarly to the first embodiment, an annular member 67, a disc 66, a disc 65, a plurality of discs 64, a plurality of discs 63, a disc 62, the piston 18, a disc 82, a plurality of discs 83, a plurality of discs 84, a plurality of discs 101, and a disc 102 are stacked in order on a shaft step part 29 while a mounting shaft part 28 of the piston rod 21 with the mounting shaft part 28 positioned at an upper portion in the vertical direction is fitted into each of them.

Then, while the mounting shaft part 28 is fitted therein, the sub-assembly 200B described above is stacked on the disc 102 in the valve seat member 105B with an opening enlarged diameter part 125 directed to face the piston 18 side in the cap member 108. At this time, the inner cylindrical part 126 of the cap member 108 is fitted to the mounting shaft part 28.

Further, a disc 110 and an annular member 111 are stacked in order on the bottom part 122 of the cap member 108 while the mounting shaft part 28 is fitted into each of them. In this state, a nut 112 is screwed onto a male screw 31 of the piston rod 21 protruding further than the annular member 111 so that inner circumferential sides of them are clamped together in the axial direction with the nut 112 and the shaft step part 29.

In such a shock absorber 1B of the third embodiment, since the valve seat member 105B is press-fitted into the cap member 108 on the outer circumference, a seal member between them can be eliminated. Therefore, the number of parts can be reduced. Also, since the valve seat member 105B is press-fitted into the cap member 108 to form the sub-assembly 200B, a sub-assembly state of the sub-assembly 200B can be firmly maintained.

Further, in the third embodiment, a structure in which the washer 211 and the disc 212 as in the second embodiment are provided between the bottom part 122 and the discs 107 of the cap member 108 may also be provided.

Also, also in the third embodiment, as described in the first embodiment, the sub-assembly 200B and a sub-valve 181 can be attached in a direction opposite to the above in the axial direction while securing a deformation allowance of the sub-valve 181 using the same discs as the discs 84.

Fourth Embodiment

Next, a fourth embodiment will be described mainly on the basis of FIG. 7, focusing on the differences from the first embodiment. Incidentally, parts common to those in the first embodiment will be denoted by the same terms and the same reference signs.

Figure 7:
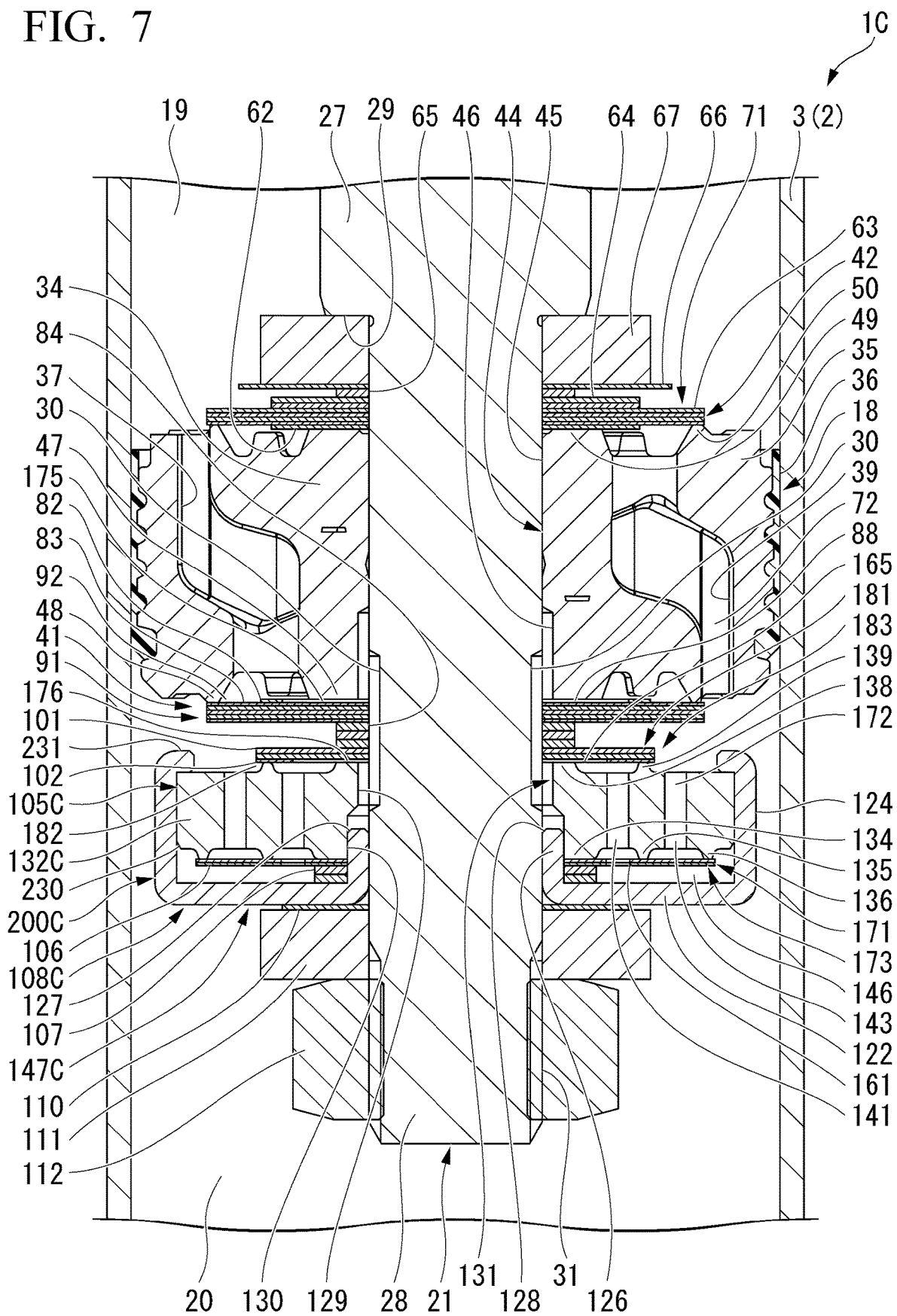
FIG. 7 is a partial cross-sectional view illustrating surroundings of a piston of a shock absorber of a fourth embodiment according to the present invention.

In a shock absorber 1C of the fourth embodiment, as illustrated in FIG. 7, a valve seat member 105C which is partially different from the valve seat member 105 of the first embodiment is provided instead of the valve seat member 105. The valve seat member 105C includes a main body part 132C having a larger outer diameter than the main body part 132 of the first embodiment while the seal groove 145 of the first embodiment is not formed therein. The outer diameter of the valve seat member 105C is an outer diameter that is fitted into an outer cylindrical part 124 of a cap member 108 with almost no clearance. A chamfer 230 is formed over the entire circumference on an outer circumferential edge portion in an axial direction of the valve seat member 105C on an outer valve seat part 136 side.

Also, in the shock absorber 1C of the fourth embodiment, a cap member 108C which is partially different from the cap member 108 of the first embodiment is provided instead of the cap member 108. In the cap member 108C, an annular locking part 231 extending radially inward from a side of the outer cylindrical part 124 opposite to a bottom part 122 in an axial direction is formed instead of the opening enlarged diameter part 125 of the first embodiment.

A plurality of discs 106, a plurality of discs 107, and the valve seat member 105C are housed in the cap member 108C. The cap member 108C and the valve seat member 105C constitute a housing 147C.

When the shock absorber 1C of the fourth embodiment is assembled, the cap member 108C, the plurality of discs 107, the plurality of discs 106 constituting a sub-valve 171, and the valve seat member 105C are pre-assembled to form a sub-assembly 200C.

In that case, for example, before the locking part 231 is formed, the cap member 108C having a shape in which the outer cylindrical part 124 extends to an end opposite to the bottom part 122 is prepared, the plurality of discs 107 are placed on the bottom part 122 of the cap member 108C by fitting the discs 107 to an inner cylindrical part 126 of the cap member 108C with the bottom part 122 positioned at a lower portion in a vertical direction, and the discs 106 are placed on the discs 107 by fitting the plurality of discs 106 to the inner cylindrical part 126.

Then, the valve seat member 105C is directed so that an inner seat part 134, an intermediate valve seat part 135, and the outer valve seat part 136 face the discs 106 side, an outer circumferential portion of the main body part 132C of the valve seat member 105C is fitted into the outer cylindrical part 124 of the cap member 108C, and a large diameter hole portion 130 is fitted to the inner cylindrical part 126 while the main body part 132C is guided by the outer cylindrical part 124. Thereafter, an end portion of the outer cylindrical part 124 on a side opposite to the bottom part 122 is plastically deformed by swaging inward in a radial direction over the entire circumference to form the locking part 231. Then, the locking part 231 and the bottom part 122 sandwich the valve seat member 105C, the plurality of discs 106, and the plurality of discs 107.

Further, when the outer circumferential portion of the main body part 132C is fitted into the outer cylindrical part 124 of the cap member 108 before the swaging, the chamfer 230 of the main body part 132C guides the main body part 132C to be positioned in the radial direction. Also, when the locking part 231 is formed by swaging, the valve seat member 105C and the locking part 231 are hermetically sealed over the entire circumference. In this state, the sub-valve 171 and the valve seat member 105C are housed in the cap member 108C.

When the valve seat member 105C is fitted into the outer cylindrical part 124 and locked to the locking part 231 in this way, the valve seat member 105C and the cap member 108C are fixed while relative axial movement and relative radial movement are restricted. Also at this time, since the large diameter hole portion 130 and the inner cylindrical part 126 are maintained in a fitted state, the plurality of discs 106 and the plurality of discs 107 fitted to the inner cylindrical part 126 being come out of the inner cylindrical part 126 is restricted by the valve seat member 105C. Therefore, since the plurality of discs 106 and the plurality of discs 107 are maintained in a fitted state to the inner cylindrical part 126, they are positioned in the radial direction with respect to the cap member 108C and maintained in a state in which a positional deviation thereof in the radial direction is restricted. In this way, the cap member 108C, the plurality of discs 107, the plurality of discs 106, and the valve seat member 105C form the integral sub-assembly 200C.

When a piston 18, the sub-assembly 200C, and the like are assembled to a piston rod 21, for example, similarly to the first embodiment, an annular member 67, a disc 66, a disc 65, a plurality of discs 64, a plurality of discs 63, a disc 62, the piston 18, a disc 82, a plurality of discs 83, a plurality of discs 84, a plurality of discs 101, and a disc 102 are stacked in order on a shaft step part 29 while a mounting shaft part 28 of the piston rod 21 with the mounting shaft part 28 positioned at an upper portion in the vertical direction is fitted into each of them.

Then, while the mounting shaft part 28 is fitted therein, the sub-assembly 200C described above is stacked on the disc 102 in the valve seat member 105C with the locking part 231 directed to face the piston 18 side in the cap member 108C. At this time, the inner cylindrical part 126 of the cap member 108 is fitted to the mounting shaft part 28.

Further, a disc 110 and an annular member 111 are stacked in order on the bottom part 122 of the cap member 108C while the mounting shaft part 28 is fitted into each of them. In this state, a nut 112 is screwed onto a male screw 31 of the piston rod 21 protruding further than the annular member 111 so that inner circumferential sides of them are clamped together in the axial direction with the nut 112 and the shaft step part 29.

In such a shock absorber 1C of the fourth embodiment, since the cap member 108C locks the valve seat member 105C by swaging, a seal member between them can be eliminated. Therefore, the number of parts can be reduced. Further, since the cap member 108C locks the valve seat member 105C by swaging, a sub-assembled state of the sub-assembly 200C can be firmly maintained.

Further, in the fourth embodiment, a structure in which the washer 211 and the disc 212 as in the second embodiment are provided between the bottom part 122 and the discs 107 of the cap member 108C may also be provided.

Also, also in the fourth embodiment, as described in the first embodiment, the sub-assembly 200C and a sub-valve 181 can be attached in a direction opposite to the above in the axial direction while securing a deformation allowance of the sub-valve 181 using the same discs as the discs 84.

Fifth Embodiment

Next, a fifth embodiment will be described mainly on the basis of FIG. 8, focusing on the differences from the first embodiment. Incidentally, parts common to those in the first embodiment will be denoted by the same terms and the same reference signs.

Figure 8:
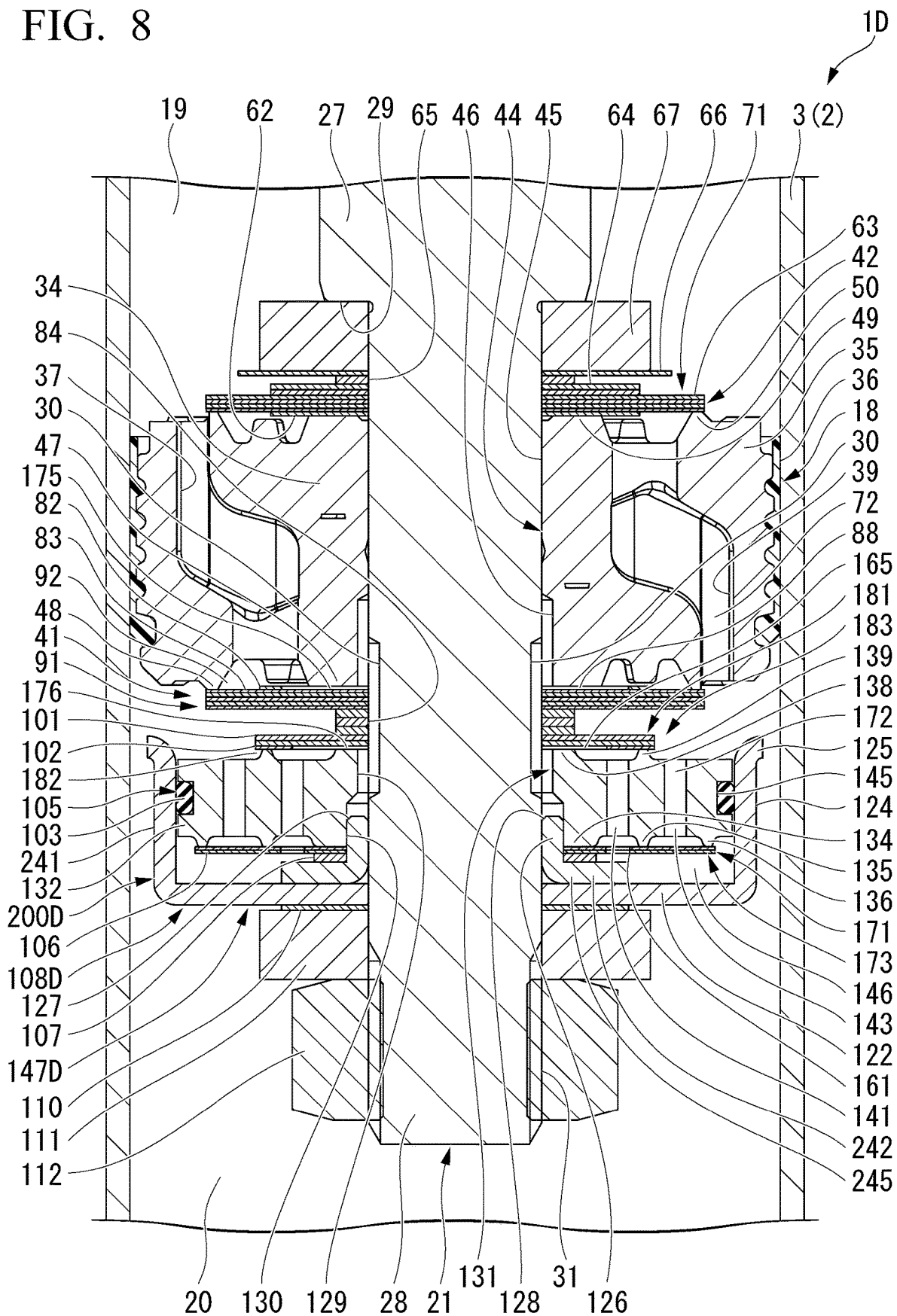
FIG. 8 is a partial cross-sectional view illustrating surroundings of a piston of a shock absorber of a fifth embodiment according to the present invention.

In a shock absorber 1D of the fifth embodiment, as illustrated in FIG. 8, a cap member 108D which is partially different from the cap member 108 of the first embodiment is provided instead of the cap member 108. The cap member 108D is constituted by two parts including a first cap member 241 and a second cap member 242.

The first cap member 241 has a shape including a bottom part 122, an outer cylindrical part 124, and an opening enlarged diameter part 125 similarly to the first embodiment while the inner cylindrical part 126 of the first embodiment is not formed. The first cap member 241 is fitted to a mounting shaft part 28 at the bottom part 122 to be positioned in a radial direction with respect to the mounting shaft part 28.

The second cap member 242 includes an inner cylindrical part 126 similar to that of the first embodiment, and a flange part 245 extending radially outward from an end portion of the inner cylindrical part 126 on a side opposite to chamfers 127 and 128 in an axial direction. In other words, the second cap member 242 forms the inner cylindrical part 126. The second cap member 242 is fitted to the mounting shaft part 28 at the inner cylindrical part 126 to be positioned in the radial direction with respect to the mounting shaft part 28.

A plurality of discs 106, a disc 107, a valve seat member 105, and a seal member 103 are housed in the cap member 108D. The cap member 108D, the valve seat member 105, and the seal member 103 constitute a housing 147D. The discs 106 and 107 are fitted to the inner cylindrical part 126 of the second cap member 242 and placed on the flange part 245.

In the fifth embodiment, the number of discs 107 is one that is smaller than that of the first embodiment by a thickness of the flange part 245 of the second cap member 242. Also, an axial length of the cap member 108D and an axial length of the mounting shaft part 28 are larger than those in the first embodiment according to an extent to which they cannot be adjusted by the number of discs 107.

When the shock absorber 1D of the fifth embodiment is assembled, the cap member 108D constituted by the two parts including the first cap member 241 and the second cap member 242, the disc 107, the plurality of discs 106, the valve seat member 105, and the seal member 103 are pre-assembled to form a sub-assembly 200D.

In that case, for example, the disc 107 is placed on the flange part 245 by fitting the disc 107 to the inner cylindrical part 126 of the second cap member 242 with the flange part 245 positioned at a lower portion in the vertical direction, and the plurality of discs 106 are placed on the disc 107 by fitting the discs 106 to the inner cylindrical part 126.

Then, the valve seat member 105 with the seal member 103 mounted in a seal groove 145 is directed so that an inner seat part 134, an intermediate valve seat part 135, and an outer valve seat part 136 face the discs 106 side, and the valve seat member 105 is placed on the discs 106 while a large diameter hole portion 130 is fitted to the inner cylindrical part 126. Thereafter, these are vertically inverted upside down and are covered by the first cap member 241 so that the outer cylindrical part 124 is fitted to an outer circumferential portion of a main body part 132 of the valve seat member 105 and an outer circumferential portion of the seal member 103. Then, the valve seat member 105 and the bottom part 122 of the first cap member 241 sandwich the plurality of discs 106, the disc 107, and the flange part 245 of the second cap member 242.

When the seal member 103 is covered by the outer cylindrical part 124 of the first cap member 241 while being mounted on the valve seat member 105, the seal member 103 generates a frictional force between both of the valve seat member 105 and the outer cylindrical part 124 as in the first embodiment. In this state, relative axial movement between the valve seat member 105 and the first cap member 241 is restricted only by the frictional force of the seal member 103. Then, relative axial movement between the valve seat member 105 and the second cap member 242 is also restricted. As a result, the large diameter hole portion 130 and the inner cylindrical part 126 are maintained in a fitted state. Therefore, the plurality of discs 106 and the disc 107 fitted to the inner cylindrical part 126 being come out of the inner cylindrical part 126 is restricted by the valve seat member 105. Therefore, since the plurality of discs 106 and the disc 107 are maintained in a fitted state to the inner cylindrical part 126, they are positioned in the radial direction with respect to the cap member 108 and maintained in a state in which a positional deviation thereof in the radial direction is restricted.

Moreover, when the valve seat member 105 that is fitted into the outer cylindrical part 124 via the seal member 103 is positioned in the radial direction with respect to the first cap member 241, and the large diameter hole portion 130 and the inner cylindrical part 126 are fitted, the second cap member 242 is positioned in the radial direction with respect to the valve seat member 105. As a result, the second cap member 242 is positioned in the radial direction with respect to the first cap member 241. The plurality of discs 106 and the disc 107 fitted to such an inner cylindrical part 126 of the second cap member 242 are positioned in the radial direction with respect to the cap member 108D, and thereby a positional deviation thereof in the radial direction is restricted. In this way, the first cap member 241, the second cap member 242, the disc 107, the plurality of discs 106, the valve seat member 105, and the seal member 103 form the integral sub-assembly 200D.

When a piston 18, the sub-assembly 200D, and the like are assembled to a piston rod 21, for example, similarly to the first embodiment, an annular member 67, a disc 66, a disc 65, a plurality of discs 64, a plurality of discs 63, a disc 62, the piston 18, a disc 82, a plurality of discs 83, a plurality of discs 84, a plurality of discs 101, and a disc 102 are stacked in order on a shaft step part 29 while the mounting shaft part 28 of the piston rod 21 with the mounting shaft part 28 positioned at an upper portion in the vertical direction is fitted into each of them.

Then, while the mounting shaft part 28 is fitted therein, the sub-assembly 200D described above is stacked on the disc 102 in the valve seat member 105 with the opening enlarged diameter part 125 directed to face the piston 18 side in the cap member 108D. At this time, the mounting shaft part 28 is fitted into the inner cylindrical part 126 of the second cap member 242 and the bottom part 122 of the first cap member 241.

Further, a disc 110 and an annular member 111 are stacked in order on the bottom part 122 of the first cap member 241 while the mounting shaft part 28 is fitted into each of them. In this state, a nut 112 is screwed onto a male screw 31 of the piston rod 21 protruding further than the annular member 111 so that inner circumferential sides of them are clamped together in the axial direction with the nut 112 and the shaft step part 29.

At this time, the inner cylindrical part 126 of the second cap member 242 is not in contact with the valve seat member 105 in the axial direction, and a fastening axial force from the nut 112 is transmitted to the shaft step part 29 via the annular member 111, the disc 110, the bottom part 122 of the first cap member 241, the flange part 245 of the second cap member 242, the disc 107, the plurality of discs 106, the inner seat part 134 of the valve seat member 105, the main body part 132, the inner seat part 138, the disc 102, the plurality of discs 101, the plurality of discs 84, the plurality of discs 83, the disc 82, an inner seat part 47 of the piston, a main body part 34, an inner seat part 49, the disc 62, the plurality of discs 63, the plurality of discs 64, the disc 65, the disc 66, and the annular member 67.

In such a shock absorber 1D of the fifth embodiment, the cap member 108D is constituted by two parts including the first cap member 241 having the bottom part 122 and the outer cylindrical part 124, and the second cap member 242 that forms the inner cylindrical part 126. Therefore, forming by pressing is facilitated, and an incidence of defective products can be reduced. Particularly, when an axial length of the cap member 108D is large, forming by pressing is facilitated by making it with two parts.

In the fifth embodiment, a structure in which the washer 211 and the disc 212 as in the second embodiment are provided between the flange part 245 of the second cap member 242 and the disc 107 may also be provided.

Also, in the fifth embodiment, a structure in which the valve seat member 105 is press-fitted into the outer cylindrical part 124 of the first cap member 241 to eliminate the seal member 103 as in the third embodiment may also be provided. Also in that case, a structure in which the washer 211 and the disc 212 as in the second embodiment are provided can be made.

Further, in the fifth embodiment, a structure in which a locking part is formed on a side of the outer cylindrical part 124 of the first cap member 241 opposite to the bottom 120 by swaging as in the fourth embodiment, the valve seat member 105 is locked by the locking part, and the seal member 103 is eliminated may also be provided. Also in that case, a structure in which the washer 211 and the disc 212 as in the second embodiment are provided can be made.

Also in the fifth embodiment, as described in the first embodiment, the sub-assembly 200D and a sub-valve 181 can be attached in a direction opposite to the above in the axial direction while securing a deformation allowance of the sub-valve 181 using the same discs as the discs 84.

Sixth Embodiment

Next, a sixth embodiment will be described mainly on the basis of FIG. 9, focusing on the differences from the first embodiment. Incidentally, parts common to those in the first embodiment will be denoted by the same terms and the same reference signs. A shock absorber 1E of the sixth embodiment is a shutter type damping force adjusting type shock absorber, and its basic structure and operation are the same as those described in Japanese Unexamined Patent Application, First Publication No. 2013-204772.

Figure 9:
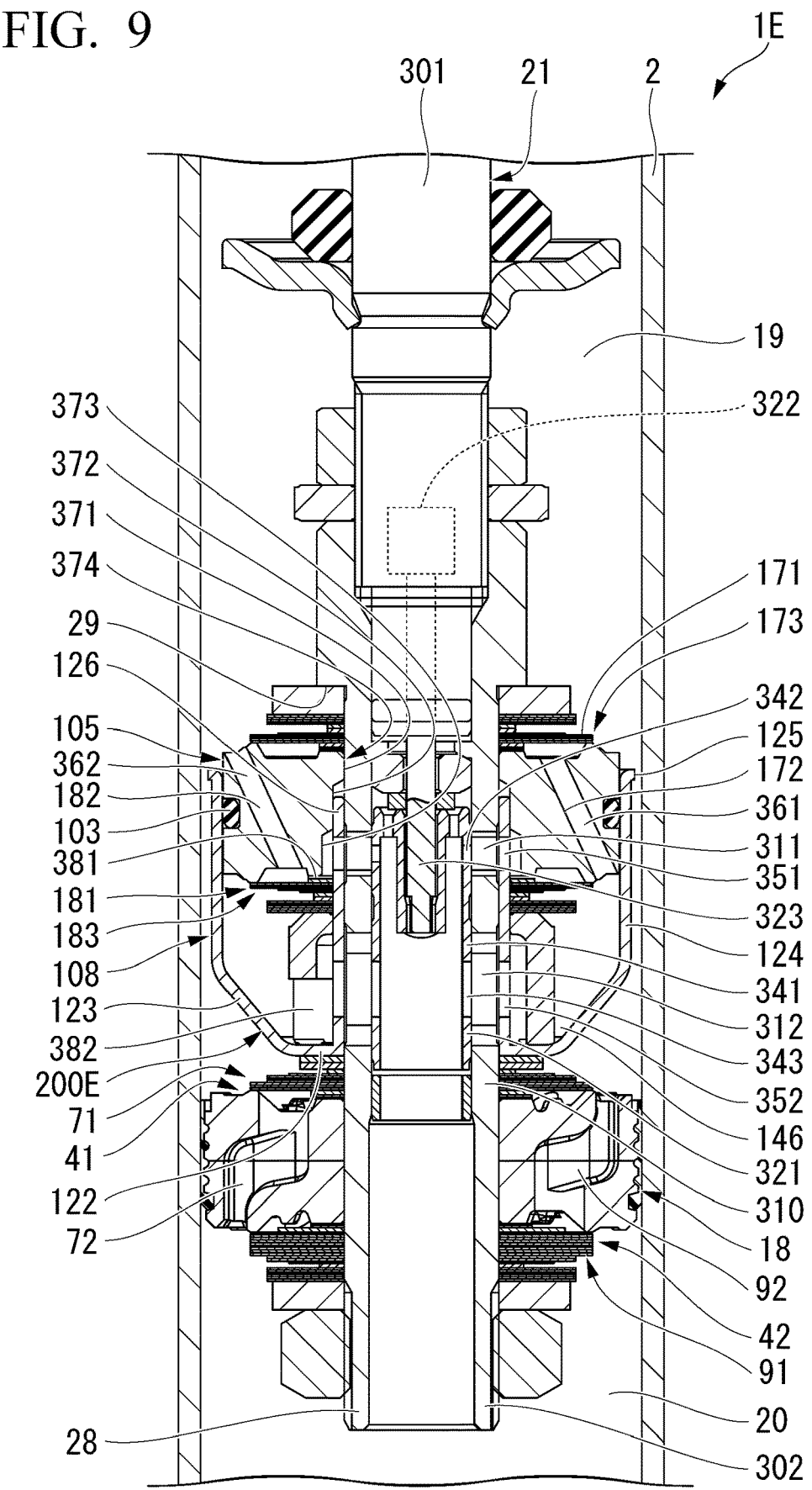
FIG. 9 is a partial cross-sectional view illustrating surroundings of a piston of a shock absorber of a sixth embodiment according to the present invention.

As illustrated in FIG. 9, the shock absorber 1E of the sixth embodiment includes a cylinder 2 in which an oil fluid is sealed as a working fluid, a piston 18 provided to be slidable in the cylinder 2 and partitioning the inside of the cylinder 2 into two chambers including an upper chamber 19 and a lower chamber 20, and a piston rod 21 connected to the piston 18 and extending to the outside of the cylinder 2.

The piston rod 21 includes a main shaft part constituent member 301 extending to the outside of the cylinder 2 and a mounting shaft part constituent member 302 (guide member) disposed in the cylinder 2, and these are connected to constitute the piston rod 21. In the piston rod 21, a mounting shaft part 28 and a shaft step part 29 are formed in the mounting shaft part constituent member 302.

A first passage 72 on a compression side through which the oil fluid flows out from the lower chamber 20 on an upstream side to the upper chamber 19 on a downstream side in the cylinder 2 due to movement of the piston 18 to the compression side is formed in the piston 18. A first damping force generation mechanism 41 including a compression-side main valve 71 provided in the compression-side first passage 72 to generate a damping force is provided on the upper chamber 19 side of the piston 18.

Further, an extension-side first passage 92 in which the oil fluid flows out from the upper chamber 19 on an upstream side to the lower chamber 20 on a downstream side in the cylinder 2 due to movement of the piston 18 to the extension side is formed in the piston 18. An extension-side first damping force generation mechanism 42 including a main valve 91 provided in the extension-side first passage 92 to generate a damping force is provided on the lower chamber 20 side of the piston 18.

The mounting shaft part constituent member 302 provided in the piston rod 21 has a cylindrical shape as a whole, and therefore, the mounting shaft part 28 also has a cylindrical shape. A cylindrical side wall 310 constituting an intermediate portion of the mounting shaft part 28 in an axial direction includes a guide port 311 penetrating in a radial direction and also includes a guide port 312 penetrating in the radial direction on a side opposite to the shaft step part 29 with respect to the guide port 311.

A cylindrical shutter member 321 is rotatably fitted in the mounting shaft part constituent member 302. The shutter member 321 is connected to a rotating shaft 323 of an electric drive unit 322 (driving means) provided in the main shaft part constituent member 301 and is therefore driven by the electric drive unit 322 to rotate in the mounting shaft part constituent member 302.

The shutter member 321 includes a shutter port 342 facing the guide port 311 and a shutter port 343 facing the guide port 312 on a cylindrical side wall 341. The guide port 311 and the shutter port 342 facing the guide port 311 can communicate with each other, and a volume of communication thereof changes according to a rotational position of the shutter member 321. Also, the guide port 312 and the shutter port 343 facing the guide port 312 can communicate with each other, and a volume of communication thereof changes according to a rotational position of the shutter member 321. The shutter ports 342 and 343 are in constant communicate with the lower chamber 20 via an inner circumferential side of the shutter member 321 and an inner circumferential side of the mounting shaft part constituent member 302.

An annular valve seat member 105 disposed in the upper chamber 19 on one of the upper chamber 19 and the lower chamber 20, a seal member 103 provided on an outer circumference of the valve seat member 105, and a cap member 108 having a bottomed cylindrical shape are provided between the piston 18 and the shaft step part 29 in the mounting shaft part constituent member 302.

The cap member 108 includes a bottom part 122 having a bored circular flat plate shape, a tapered cylindrical part 123 extending from an outer circumferential edge portion of the bottom part 122 while a diameter thereof expands to one side in the axial direction, a cylindrical outer cylindrical part 124 extending in a direction opposite to the bottom part 122 from an end portion on a side of the tapered cylindrical part 123 opposite to the bottom part 122, an opening enlarged diameter part 125 extending from an end portion on a side of the outer cylindrical part 124 opposite to the tapered cylindrical part 123 while a diameter thereof expands in a direction opposite to the tapered cylindrical part 123, and a cylindrical inner cylindrical part 126 extending from an inner circumferential edge portion of the bottom part 122 to the same side as the tapered cylindrical part 123 and the outer cylindrical part 124.

The cap member 108 forms a cap chamber 146 by fitting the valve seat member 105 and the seal member 103 on an inner side of the outer cylindrical part 124. A through hole 351 penetrating in the radial direction is formed in the inner cylindrical part 126 of the cap member 108. A through hole 352 penetrating in the radial direction is formed on the bottom part 122 side with respect to the through hole 351.

The through hole 351 communicates with the guide port 311, and the through hole 352 communicates with the guide port 312.

A passage hole 361 constituting a compression-side second passage 172 and a passage hole 362 constituting an extension-side second passage 182 are formed in the valve seat member 105. The valve seat member 105 includes a through hole 374 having a small diameter hole portion 371, a medium diameter hole portion 372, and a large diameter hole portion 373 formed in a center thereof in the radial direction. In the valve seat member 105, the mounting shaft part 28 is fitted into the small diameter hole portion 371, and the inner cylindrical part 126 of the cap member 108 is fitted into the medium diameter hole portion 372.

A second damping force generation mechanism 173 including a compression-side sub-valve 171 provided in the compression-side second passage 172 to generate a damping force is provided on the shaft step part 29 side of the valve seat member 105.

A second damping force generation mechanism 183 including an extension-side sub-valve 181 provided in the extension-side second passage 182 to generate a damping force is provided on a side of the valve seat member 105 opposite to the shaft step part 29. A passage forming member 381 that forms a passage penetrating in the radial direction is provided between the sub-valve 181 and the piston 18. A passage forming member 382 that forms a passage penetrating in the radial direction is provided on a side of the sub-valve 181 opposite to the piston 18.

The compression-side second passage 172 is constituted by passages on an inner circumferential side of the mounting shaft part constituent member 302 and the shutter member 321, a passage in the shutter port 343 of the shutter member 321, a passage in the guide port 312 of the mounting shaft part constituent member 302, a passage in the through hole 352 of the cap member 108, a passage in the passage forming member 382, the cap chamber 146, and a passage in the passage hole 361. In the compression-side second passage 172, the oil fluid flows out from the lower chamber 20 on the upstream side to the upper chamber 19 on the downstream side in the cylinder 2 due to movement of the piston 18 to the compression side. The compression-side second passage 172 is provided in parallel with the compression-side first passage 72. The second damping force generation mechanism 173 is provided in the second passage 172 to generate a damping force.

The extension-side second passage 182 includes a passage in the passage hole 362, a passage in the passage forming member 381, a passage in the large diameter hole portion 373 of the valve seat member 105, a passage in the through hole 351 of the cap member 108, a passage in the guide port 311 of the mounting shaft part constituent member 302, a passage in the shutter port 342 of the shutter member 321, and passages on an inner circumferential side of the shutter member 321 and the mounting shaft part constituent member 302. Also, the extension-side second passage 182 includes a passage of the second damping force generation mechanism 183 in an open state, the cap chamber 146, a passage in the passage forming member 382, a passage in the through hole 352 of the cap member 108, a passage in the guide port 312 of the mounting shaft part constituent member 302, and a passage in the shutter port 343 of the shutter member 321. In the extension-side second passage 182, the oil fluid flows out from the upper chamber 19 on the upstream side to the lower chamber 20 on the downstream side in the cylinder 2 due to movement of the piston 18 to the extension side. The extension-side second passage 182 is provided in parallel with the extension-side first passage 92. The second damping force generation mechanism 183 is provided in the second passage 182 to generate a damping force.

The mounting shaft part constituent member 302, the shutter member 321 and the electric drive unit 322 constitute a part of the second damping force generation mechanisms 173 and 183. The second damping force generation mechanisms 173 and 183 include the sub-valve 171 provided on one side of the second passages 172 and 182 formed in the valve seat member 105 and the sub-valve 181 provided on the other side thereof. The second damping force generation mechanism 183 includes the cap member 108. The cap member 108 houses the sub-valve 181 which is a part of the second damping force generation mechanism 183, the valve seat member 105, and the passage forming member 382.

When the shock absorber 1E of the sixth embodiment is assembled, the cap member 108, the passage forming member 382, the sub-valve 181, the valve seat member 105, and the seal member 103 are pre-assembled to form a sub-assembly 200E.

In that case, for example, the passage forming member 382 is placed on the bottom part 122 by fitting the passage forming member 382 to the inner cylindrical part 126 of the cap member 108 with the bottom part 122 positioned on a lower side in the vertical direction, and furthermore, the sub-valve 181 is placed on the passage forming member 382 by fitting the sub-valve 181 to the inner cylindrical part 126.

Then, the valve seat member 105 with the seal member 103 mounted on an outer circumferential portion thereof is fitted into the outer cylindrical part 124 of the cap member 108 together with the seal member 103, and the medium diameter hole portion 372 is fitted into the inner cylindrical part 126. Then, the valve seat member 105 and the bottom part 122 of the cap member 108 sandwich the sub-valve 181 and the passage forming member 382.

When the seal member 103 is inserted into the outer cylindrical part 124 of the cap member 108 while being mounted on the valve seat member 105, a frictional force is generated between both the valve seat member 105 and the outer cylindrical part 124 to restrict relative axial movement of the valve seat member 105 and the cap member 108 as in the first embodiment. As a result, the medium diameter hole portion 372 and the inner cylindrical part 126 are maintained in a fitted state. Therefore, the sub-valve 181 and the passage forming member 382 fitted to the inner cylindrical part 126 being come out of the inner cylindrical part 126 is restricted by the valve seat member 105. Therefore, since the sub-valve 181 and the passage forming member 382 are maintained in a fitted state to the inner cylindrical part 126, they are positioned in the radial direction with respect to the cap member 108 and maintained in a state in which a positional deviation thereof in the radial direction is restricted. In this way, the cap member 108, the sub-valve 181, the passage forming member 382, the valve seat member 105, and the seal member 103 form the integral sub-assembly 200E.

In an extension stroke of the shock absorber 1E of the sixth embodiment, for example, the first damping force generation mechanism 42 opens the valve, and the oil fluid flows from the upper chamber 19 to the lower chamber 20 through the first passage 92.

Also, for example, in the extension stroke, the oil fluid flows from the upper chamber 19 to the lower chamber 20 via passages constituting the second passage 182 including the passage in the passage hole 362, the passage in the passage forming member 381, the passage in the large diameter hole portion 373 of the valve seat member 105, the passage in the through hole 351 of the cap member 108, the passage in the guide port 311 of the mounting shaft part constituent member 302, the passage in the shutter port 342 of the shutter member 321, and the passages on an inner circumferential side of the shutter member 321 and the mounting shaft part constituent member 302. At this time, a volume of communication between the passage in the guide port 311 of the mounting shaft part constituent member 302 and the passage in the shutter port 342 of the shutter member 321 is changed by driving of the electric drive unit 322, and thereby a damping force is adjusted.

Also, for example, in the extension stroke, the oil fluid flows from the upper chamber 19 to the lower chamber 20 via passages constituting the second passage 182 including the passage in the passage hole 362, the passage of the second damping force generation mechanism 183 that opens the valve, the cap chamber 146, the passage in the passage forming member 382, the passage in the through hole 352 of the cap member 108, the passage in the guide port 312 of the mounting shaft part constituent member 302, a passage in the shutter port 343 of the shutter member 321, and the passages on an inner circumferential side of the shutter member 321 and the mounting shaft part constituent member 302. At this time, a volume of communication between the passage in the guide port 312 of the mounting shaft part constituent member 302 and the passage in the shutter port 343 of the shutter member 321 is changed by driving of the electric drive unit 322, and thereby a damping force is adjusted.

In the compression stroke, for example, the first damping force generation mechanism 41 opens the valve, and the oil fluid flows from the lower chamber 20 to the upper chamber 19 via the first passage 72.

Also, for example, in the compression stroke, the oil fluid flows from the lower chamber 20 to the upper chamber 19 via passages constituting the second passage 172 including the passages on the inner circumferential side of the mounting shaft part constituent member 302 and the shutter member 321, the passage in the shutter port 343 of the shutter member 321, the passage in the guide port 312 of the mounting shaft part constituent member 302, the passage in the through hole 352 of the cap member 108, the passage in the passage forming member 382, the cap chamber 146, the passage in the passage hole 361, and the passage in the second damping force generation mechanism 173 that opens the valve. At this time, a volume of communication between the passage in the guide port 312 of the mounting shaft part constituent member 302 and the passage in the shutter port 343 of the shutter member 321 is changed by driving of the electric drive unit 322, and thereby a damping force is adjusted.

Also in the sixth embodiment, as described in the first embodiment, the sub-assembly 200E and the sub-valve 171 can be attached in a direction opposite to the above in the axial direction while securing a deformation allowance of the sub-valve 171.

The first to sixth embodiments have described examples in which the present invention is used for a dual-tube type hydraulic shock absorber, but the present invention is not limited thereto, and the present invention may be used for a mono-tube type hydraulic shock absorber in which an outer tube is eliminated and a gas chamber is formed with a slidable partition on a side of the lower chamber 20 opposite to the upper chamber 19 in the cylinder 2, or can be used for any shock absorber including a pressure control valve that uses a packing valve having a structure in which a seal member is provided in a disc.

A first aspect of the embodiment described above includes a cylinder in which a working fluid is sealed, a piston provided to be slidable in the cylinder and partitioning the inside of the cylinder into two chambers, a piston rod connected to the piston and extending to the outside of the cylinder, a first passage and a second passage through which the working fluid flows out from the chamber on an upstream side to the chamber on a downstream side in the cylinder due to movement of the piston, a first damping force generation mechanism provided in the first passage formed in the piston to generate a damping force, and a second damping force generation mechanism provided in an annular valve seat member disposed in one of the chambers and provided in the second passage in parallel with the first passage to generate a damping force, in which the second damping force generation mechanism includes a first sub-valve provided on one side of the second passage formed in the valve seat member and a second sub-valve provided on the other side thereof, and a bottomed cylindrical cap member having an outer cylindrical part and a bottom part, and the cap member includes an inner cylindrical part into which the piston rod can be inserted formed on an inner circumferential side of the bottom part and houses at least a part of the second damping force generation mechanism. Thereby, productivity can be improved.

In a second aspect, in the first aspect, the second sub-valve and the valve seat member are housed in the cap member, and the valve seat member can be sub-assembled to the cap member by a seal member provided on an outer circumference.

In a third aspect, in the first aspect, the second sub-valve and the valve seat member are housed in the cap member, and an outer circumference of the valve seat member is press-fitted into the cap member.

In a fourth aspect, in any one of the first to third aspects, a washer is provided between the bottom part and the second sub-valve in the cap member.

In a fifth aspect, in any one of the first to fourth aspects, the cap member includes a first cap member having the outer cylindrical part and the bottom part, and a second cap member forming the inner cylindrical part.

In a sixth aspect, in any one of the first to fifth aspects, the cap member is formed by press forming.

In a seventh aspect, in any one of the first to sixth aspects, the second damping force generation mechanism opens the valve while the first damping force generation mechanism is in a valve closed state in a region in which a piston speed is low, and both the first damping force generation mechanism and the second damping force generation mechanism open the valves in a speed region in which the piston speed is higher than the low speed.

In an eighth aspect, in any one of the first to seventh aspects, in the second damping force generation mechanism, the valve seat member is provided in the cap member, the first sub-valve is provided in one of the chambers, the second sub-valve is provided in a cap chamber between the bottom part of the cap member and the valve seat member, and an orifice is provided in the second passage on an upstream side or a downstream side of a flow when the first sub-valve opens.

In a ninth aspect, in any one of the first to sixth aspects, the second damping force generation mechanism includes a cylindrical guide member provided in the piston rod and having a guide port on a side wall, a shutter member fitted to be rotatable in the guide member and having a shutter port facing the guide port on the side wall, and a driving means configured to drive the shutter member.

INDUSTRIAL APPLICABILITY

When the shock absorber described above is applied in the art, it is possible to provide a shock absorber in which productivity can be improved.

REFERENCE SIGNS LIST 1, 1A to 1E Shock absorber
2 Cylinder
18 Piston
19 Upper chamber
20 Lower chamber (one of chambers)
21 Piston rod
41, 42 First damping force generation mechanism
72, 92 First passage
103 Seal member
105, 105B, 105C Valve seat member
108, 108C, 108D Cap member
122 Bottom part
124 Outer cylindrical part
126 Inner cylindrical part
146 Cap chamber
171 Sub-valve (second sub-valve)
172, 182 Second passage
173, 183 Second damping force generation mechanism
175, 176 Orifice
181 Sub-valve (first sub-valve)
211 Washer
241 First cap member
242 Second cap member
302 Mounting shaft part constituent member (guide member)
310, 341 Side wall
311, 312 Guide port
321 Shutter member
322 Electric drive unit (driving means)
342, 343 Shutter port

The invention claimed is:

1. A shock absorber comprising:
a cylinder in which a working fluid is sealed;
a piston provided to be slidable in the cylinder and partitioning the inside of the cylinder into two chambers;
a piston rod connected to the piston and extending to the outside of the cylinder;
a first passage and a second passage through which the working fluid flows out from the chamber on an upstream side to the chamber on a downstream side in the cylinder due to movement of the piston;
a first damping force generation mechanism provided in the first passage formed in the piston to generate a damping force; and
a second damping force generation mechanism provided in an annular valve seat member disposed in one of the chambers and provided in the second passage in parallel with the first passage to generate a damping force, wherein
the second damping force generation mechanism includes:
a first sub-valve provided on one side of the second passage formed in the valve seat member and a second sub-valve provided on the other side thereof; and
a bottomed cylindrical cap member having an outer cylindrical part, a bottom part, and an inner cylindrical part which is provided on an inner circumferential side of the bottom part and through which the piston rod is able to be inserted, and
at least a part of the valve seat member is housed between the outer cylindrical part and the inner cylindrical part of the cap member.

2. The shock absorber according to claim 1, wherein
the second sub-valve is housed between the outer cylindrical part and the inner cylindrical part of the cap member, and
the valve seat member is able to be sub-assembled to the cap member by a seal member provided on an outer circumference.

3. The shock absorber according to claim 1, wherein
the second sub-valve is housed between the outer cylindrical part and the inner cylindrical part of the cap member, and
an outer circumference of the valve seat member is press-fitted into the cap member.

4. The shock absorber according to claim 1, wherein a washer is provided between the bottom part and the second sub-valve in the cap member.

5. The shock absorber according to claim 1, wherein the cap member includes:
a first cap member having the outer cylindrical part and the bottom part; and
a second cap member forming the inner cylindrical part.

6. The shock absorber according to claim 1, wherein the cap member is formed by press forming.

7. The shock absorber according to claim 1, wherein
the second damping force generation mechanism opens the valve while the first damping force generation mechanism is in a valve closed state in a region in which a piston speed is low, and
both the first damping force generation mechanism and the second damping force generation mechanism open the valves in a speed region in which the piston speed is higher than the low speed.

8. The shock absorber according to claim 1, wherein, in the second damping force generation mechanism,
the valve seat member is provided in the cap member, the first sub-valve is provided in one of the chambers, and the second sub-valve is provided in a cap chamber between the bottom part of the cap member and the valve seat member, and
an orifice is provided in the second passage on an upstream side or a downstream side of a flow when the first sub-valve opens.

9. The shock absorber according to claim 1, wherein the second damping force generation mechanism includes:
a cylindrical guide member provided in the piston rod and having a guide port on a side wall;
a shutter member fitted to be rotatable in the guide member and having a shutter port facing the guide port on the side wall; and
a driving means configured to drive the shutter member.

* * * * *